US012634794B2

(12) United States Patent
Dillon et al.

(10) Patent No.: US 12,634,794 B2
(45) Date of Patent: May 19, 2026

(54) MULTIPATH IN-FLIGHT COMMUNICATION NETWORK ARCHITECTURE

(71) Applicant: Hughes Network Systems, LLC, Germantown, MD (US)

(72) Inventors: Douglas Merrill Dillon, Rockville, MD (US); Ryan Reza Rasoulian, Bethesda, MD (US)

(73) Assignee: HUGHES NETWORK SYSTEMS, LLC, Germantown, MD (US)

( * ) Notice: Subject to any disclaimer, the term of this patent is extended or adjusted under 35 U.S.C. 154(b) by 317 days.

(21) Appl. No.: 18/424,175

(22) Filed: Jan. 26, 2024

(65) Prior Publication Data
US 2024/0259910 A1 Aug. 1, 2024

Related U.S. Application Data

(60) Provisional application No. 63/441,644, filed on Jan. 27, 2023.

(51) Int. Cl.
*H04W 40/02* (2009.01)
*H04W 28/02* (2009.01)
(52) U.S. Cl.
CPC ....... *H04W 40/02* (2013.01); *H04W 28/0263* (2013.01)
(58) Field of Classification Search
CPC .............. H04W 40/02; H04W 28/0263; H04L 12/4633; H04L 47/125; H04B 7/18506
See application file for complete search history.

(56) References Cited

U.S. PATENT DOCUMENTS

| 7,398,552 B2 | 7/2008 | Pardee et al. |
| 9,240,950 B2 | 1/2016 | Vedula et al. |
| (Continued) | | |

FOREIGN PATENT DOCUMENTS

WO 2022251786 A1 12/2022

OTHER PUBLICATIONS

PCT, "International Preliminary Report on Patentability for Application No. PCT/US2024/013162", dated Jul. 22, 2025, 10 pages.
(Continued)

*Primary Examiner* — Ayanah S George
(74) *Attorney, Agent, or Firm* — Mannava & Kang, P.C.

(57) ABSTRACT

Systems and methods for integrating multi-path communication networks to provide In-Flight Connectivity (IFC) for users, by augmenting data streams from multi-path satellite networks are disclosed. The system includes IFC system and IAT to provide wireless network connectivity to user devices. The system includes SD-WAN router communicatively coupled to IFC system and IAT. The SD-WAN router receives request for accessing WAN from user devices, and determines parameters associated with data packets based on received request. The SD-WAN router classifies data packets into traffic types based on parameters. Furthermore, SD-WAN router prioritizes data packets based on traffic types and available network capacity for upstream transmission of data packets across IFC system and IAT. Additionally, SD-WAN router determines appropriate WAN transport path associated with SD-WAN tunnel for upstream transmission based on traffic types and performance parameters. Further, SD-WAN router transmits data packets to WAN over determined WAN transport path.

20 Claims, 15 Drawing Sheets

(56)                    References Cited

U.S. PATENT DOCUMENTS

| | | | |
|---|---|---|---|
| 9,634,945 | B2 | 4/2017 | Stevens et al. |
| 9,716,659 | B2 | 7/2017 | Dillon |
| 9,832,131 | B2 | 11/2017 | Vedula et al. |
| 9,832,169 | B2 | 11/2017 | Border et al. |
| 10,044,620 | B2 | 8/2018 | Dillon |
| 10,178,035 | B2 | 1/2019 | Dillon |
| 10,637,782 | B2 | 4/2020 | Dillon et al. |
| 11,362,920 | B2 | 6/2022 | Dillon |
| 11,381,511 | B2 | 7/2022 | Chin et al. |
| 2009/0048915 | A1* | 2/2009 | Chan .................. G06Q 30/0267 |
| | | | 705/14.64 |
| 2016/0119052 | A1* | 4/2016 | Frerking ............... H04W 24/02 |
| | | | 455/431 |
| 2022/0303203 | A1 | 9/2022 | Dillon |
| 2022/0312181 | A1 | 9/2022 | Sumien et al. |

OTHER PUBLICATIONS

Douglas M. Dillon, U.S. Appl. No. 18/092,035, titled "Mobility Multi-Transport Software- Defined Wide Area Network (SD-WAN)", filed Dec. 30, 2022, 84 pages.
Berioli M et al., "Wirelesscabin target system specification document", IST-2001-37466 Wireless Cable, XX, XX, No. D9, Jun. 1, 2003, pp. 1-209.
European Patent Office, "The International search report and written opinion for Application No. PCT/US2024/013162", dated Aug. 9, 2024, 16 pages.

* cited by examiner

500A

1000

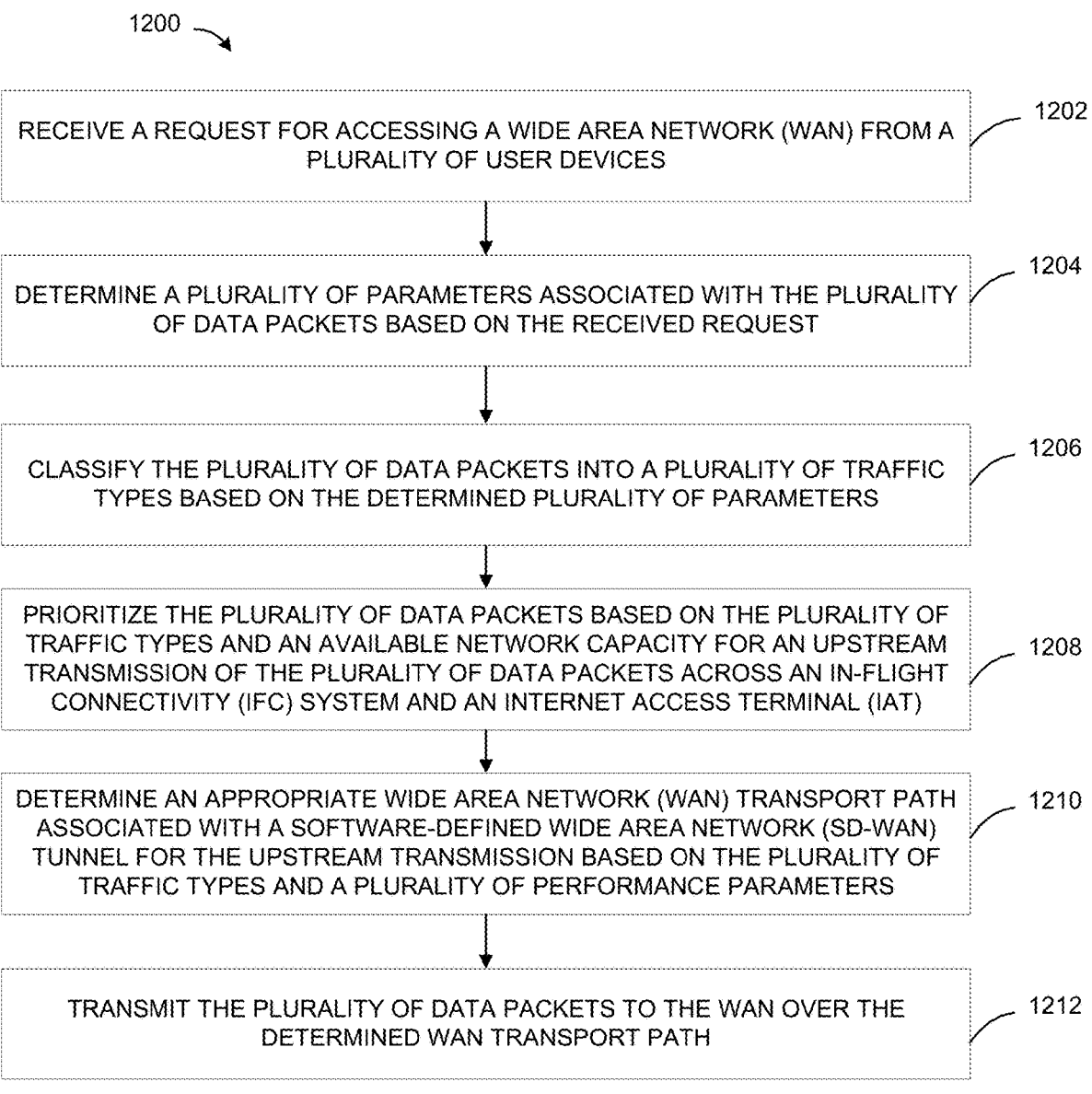

1200

RECEIVE A REQUEST FOR ACCESSING A WIDE AREA NETWORK (WAN) FROM A PLURALITY OF USER DEVICES — 1202

DETERMINE A PLURALITY OF PARAMETERS ASSOCIATED WITH THE PLURALITY OF DATA PACKETS BASED ON THE RECEIVED REQUEST — 1204

CLASSIFY THE PLURALITY OF DATA PACKETS INTO A PLURALITY OF TRAFFIC TYPES BASED ON THE DETERMINED PLURALITY OF PARAMETERS — 1206

PRIORITIZE THE PLURALITY OF DATA PACKETS BASED ON THE PLURALITY OF TRAFFIC TYPES AND AN AVAILABLE NETWORK CAPACITY FOR AN UPSTREAM TRANSMISSION OF THE PLURALITY OF DATA PACKETS ACROSS AN IN-FLIGHT CONNECTIVITY (IFC) SYSTEM AND AN INTERNET ACCESS TERMINAL (IAT) — 1208

DETERMINE AN APPROPRIATE WIDE AREA NETWORK (WAN) TRANSPORT PATH ASSOCIATED WITH A SOFTWARE-DEFINED WIDE AREA NETWORK (SD-WAN) TUNNEL FOR THE UPSTREAM TRANSMISSION BASED ON THE PLURALITY OF TRAFFIC TYPES AND A PLURALITY OF PERFORMANCE PARAMETERS — 1210

TRANSMIT THE PLURALITY OF DATA PACKETS TO THE WAN OVER THE DETERMINED WAN TRANSPORT PATH — 1212

FIG. 12

MULTIPATH IN-FLIGHT COMMUNICATION NETWORK ARCHITECTURE

PRIORITY CLAIM

This patent application claims priority to U.S. provisional application No. 63/441,644 filed with the US Patent Office on Jan. 27, 2023, the disclosure of which is incorporated by reference in its entirety.

TECHNICAL FIELD

This patent application is directed to satellite communication systems and, more specifically, to systems and methods for integrating multi-path communication networks to provide in-flight Internet Protocol (IP) connectivity for users, by augmenting data streams from multi-path satellite networks.

BACKGROUND

Generally, passengers in aircraft may require Internet connectivity during travel. Currently, aircraft may include an In-Flight Connectivity (IFC) network equipment for providing such Internet connectivity to the passengers, by authenticating and authorizing devices associated with the passengers of the aircraft. In an example, the IFC network equipment may use Geosynchronous (GEO) satellite communication network to provide the Internet connectivity to the devices associated with the passengers.

Such GEO satellite communication network may implement an existing IFC system 100 as shown in FIG. 1. IFC system 100 may be deployed on the aircraft and may coordinate between the devices and the GEO satellite communication network. Under certain circumstances, IFC system 100 may be relatively unresponsive to the devices due to latency issues associated with the GEO satellite communication network. Further, the IFC system 100 may include a plurality of Wireless Access Points (WAPs) 102-1, 102-2, . . . , 102-N (collectively referred to as WAPs 102), an IFC user Interface (I/F) 104, a GEO satellite (SAT) modem 106, a GEO SAT antenna 108, a GEO hub Earth station(s) 110, an IFC traffic shaper unit 112 and a public Internet 114. Further, the IFC system 100 may include an optional terrestrial modem(s) 116. Further, a GEO Satellite (SAT) modem 106, and a GEO SAT antenna 108 may be included in a GEO IFC terminal 118. The IFC user I/F 104 may provide optional In-Flight Entertainment (IFE), and other non-passenger traffic services.

The GEO IFC terminal may include a group of functionalities associated with the GEO Satellite (SAT) modem 106, and the GEO SAT antenna 108. The IFC user I/F 104 may provide to the user devices 116 with Internet Protocol (IP) addresses (e.g., via a Dynamic Host Configuration Protocol (DHCP)), authenticates and authorizes users assigning each authorized user a service-plan and classifies end-user traffic by traffic type and service plan. Further, the IFC user I/F 104 may shape upstream traffic, passes upstream traffic to the GEO SAT modem 106 or, when present and operating well the optional terrestrial modem 116. Furthermore, the IFC user I/F 104 may receive downstream traffic from the GEO SAT modem 106 and the optional terrestrial modem 116. Optionally a Different Service Code Point (DSCP) may mark upstream traffic with a class of service allowing the GEO SAT modem 106 to classify the traffic, and optionally shapes downstream traffic. Additionally, the terrestrial modem(s) 116 may be used when the aircraft is on the ground or over selected areas which provide ground-to-air communications. The terrestrial modem(s) 116 may be used to carry user device traffic when the terrestrial modem(s) 116 are operating appropriately, as GEO satellite communications may be less responsive.

In an example, the WAPs 102 may be configured to provide Wireless-Fidelity (Wi-Fi) connectivity to a user device 116 associated with passengers of the aircraft from the IFC user I/F 104. The user device 116 may correspond to the devices associated with the passengers as described above. The IFC user I/F 104 may provide access control (e.g., user login), traffic classification (such as traffic type, user authorization levels, and the like) and traffic shaping (prioritization, usage limits, and the like) functionalities. The GEO SAT modem 106 may be communicatively coupled to the GEO SAT antenna 108 to provide an Internet Protocol (IP) connectivity to the GEO hub Earth station(s) 110. Further, the GEO SAT modem 106 may handle spot beam handovers, and the like. The GEO SAT antenna 108 may track a GEO satellite and communicate with the GEO SAT modem 106 to provide the IP connectivity to the GEO hub Earth station(s) 110. The GEO hub earth station(s) 110 may provide connectivity via the GEO SAT modem 106 and the GEO SAT antenna 108 to the IFC user I/F 104. Additionally, as the aircraft shifts from one GEO spot beam to another GEO spot beam (or even from one satellite to another), multiple GEO hub earth station(s) 110 may be used to provide IP connectivity to the user device 116 associated with passengers of the aircraft. The IFC traffic shaper 112 may perform a classification and a traffic shaping functionality on a downstream traffic. Furthermore, the public Internet 114 may be accessed by the user device 116 associated with passengers of the aircraft.

Although, the GEO communication network may provide internet connectivity to the user device 116, the latency associated with the GEO communication network may be a challenge, particularly for response-time-sensitive end-user traffic (e.g. applications may be unresponsive). The GEO communication network may need to be supplemented with a lower-latency communications path, which are used to carry latency sensitive traffic, to provide an improved user experience/service.

Consequently, there may be a need to provide improved systems and methods for integrating multi-path communication networks to provide in-flight Internet protocol (IP) connectivity for users, by augmenting data streams from multi-path satellite networks, and to address at least the aforementioned issues in the prior art.

SUMMARY

This summary is provided to introduce a selection of concepts, in a simple manner, which is further described in the detailed description of the disclosure. This summary is neither intended to identify key or essential inventive concepts of the subject matter nor to determine the scope of the disclosure.

An aspect of the present disclosure provides a system for integrating multi-path communication networks to provide in-flight IP connectivity for users, by augmenting data streams from multi-path satellite networks. The system includes an In-Flight Connectivity (IFC) system. The IFC system provides wireless network connectivity to a plurality of user devices. Further, the system includes an Internet Access Terminal (IAT)(IAT). The IAT provides augmented wireless network connectivity to the plurality of user devices. Furthermore, the system includes a Software-Defined Wide Area Network (SD-WAN) router communicatively coupled to the IFC system and the IAT. The SD-WAN router receives a request for accessing a Wide Area Network (WAN) from the plurality of user devices. The plurality of user devices is connected to the WAN via a plurality of SD-WAN tunnels. The request includes a plurality of data packets. Further, the SD-WAN router determines a plurality of parameters associated with the plurality of data packets based on the received request. The plurality of parameters includes one of latency parameters, a class of service, user authorization levels, and service plans. The SD-WAN router classifies the plurality of data packets into a plurality of traffic types based on the determined plurality of parameters. The plurality of traffic types includes one of a latency sensitive type, and a bulk type.

For example, an aspect of the present disclosure is to supplement an existing geosynchronous satellite-based IFC system (such as a Geostationary Earth Orbit (GEO) IFC) to support a second more-responsive internet access path (sec path) (such as Low Earth Orbit (LEO) satellite). This is implemented in such a way that changes to an existing GEO IFC are minimized and in such a way that response-time sensitive traffic is carried by the sec path while bulk traffic (streaming video, and the like) is carried by a geosynchronous internet access path (geo path) associated with the GEO IFC. One implementation includes a use of an enhanced software-defined wide area network (SD-WAN) router with two WAN connections, one being the GEO IFC and the other being the sec path. The SD-WAN router is connected between the Wireless Access Points (WAPs) and the GEO IFC and an equipment associated with the sec path. Further, the SD-WAN router classifies traffic and, for each packet, the SD-WAN router selects the path to transmit packets by the geo path or the sec path.

Furthermore, the SD-WAN router prioritizes the plurality of data packets based on the plurality of traffic types and an available network capacity for an upstream transmission of the plurality of data packets across the IFC system and the IAT. Additionally, the SD-WAN router determines an appropriate Wide Area Network (WAN) transport path associated with a SD-WAN tunnel for the upstream transmission based on the plurality of traffic types and a plurality of performance parameters. The appropriate WAN transport path is determined from one of the-IFC system and the IAT. The plurality of performance parameters includes one of a class of service, a load balancing, network congestion, and a data marking. Further, the SD-WAN router transmits the plurality of data packets to the WAN over the determined WAN transport path.

Another aspect of the present disclosure provides a method for integrating multi-path communication networks to provide in-flight IP connectivity for users, by augmenting data streams from multi-path satellite networks. The method includes receiving a request for accessing a Wide Area Network (WAN) from a plurality of user devices. The plurality of user devices is connected to the WAN via a plurality of SD-WAN tunnels, and the request includes a plurality of data packets. Further, the method includes determining a plurality of parameters associated with the plurality of data packets based on the received request. The plurality of parameters comprises one of latency parameters, a class of service, user authorization levels, and service plans.

Furthermore, the method includes classifying the plurality of data packets into a plurality of traffic types based on the determined plurality of parameters. The plurality of traffic types includes one of a latency sensitive type, and a bulk type. The method further includes prioritizing the plurality of data packets based on the plurality of traffic types and an available network capacity for an upstream transmission of the plurality of data packets across an In-Flight Flight Connectivity (IFC) system and an Internet Access Terminal (IAT). Additionally, the method includes determining an appropriate Wide Area Network (WAN) transport path associated with a SD-WAN tunnel for the upstream transmission based on the plurality of traffic types and a plurality of performance parameters. The appropriate WAN transport path is determined from one of the IFC system and the IAT and the plurality of performance parameters include one of a class of service, a load balancing, network congestion, and a data marking. Further, the method includes transmitting the plurality of data packets to the WAN over the determined WAN transport path.

Yet another aspect of the present disclosure provides a non-transitory computer-readable medium comprising machine-readable instructions. That are executable by a processor to receive a request for accessing a Wide Area Network (WAN) from the plurality of user devices. The plurality of user devices is connected to the WAN via a plurality of SD-WAN tunnels, and the request includes a plurality of data packets. Further, the processor determines a plurality of parameters associated with the plurality of data packets based on the received request. The plurality of parameters includes one of latency parameters, a class of service, user authorization levels, and service plans.

Furthermore, the processor classifies the plurality of data packets into a plurality of traffic types based on the determined plurality of parameters. The plurality of traffic types comprises one of a latency sensitive type, and a bulk type. Additionally, the processor prioritizes the plurality of data packets based on the plurality of traffic types and an available network capacity for an upstream transmission of the plurality of data packets across the IFC system and the IAT. Further, the processor determines an appropriate Wide Area Network (WAN) transport path associated with a SD-WAN tunnel for the upstream transmission based on the plurality of traffic types and a plurality of performance parameters. The appropriate WAN transport path is determined from one of the IFC system and the IAT and the plurality of performance parameters comprise one of a class of service, a load balancing, network congestion, and a data marking. Furthermore, the processor transmits the plurality of data packets to the WAN over the determined WAN transport path.

To further clarify the features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

Features of the disclosed embodiments are illustrated by way of example and not limited in the following Figure(s), in which like numerals indicate like elements, in which.

5 for users, by augmenting data streams from multi-path satellite networks, according to an example.

Figure 1:
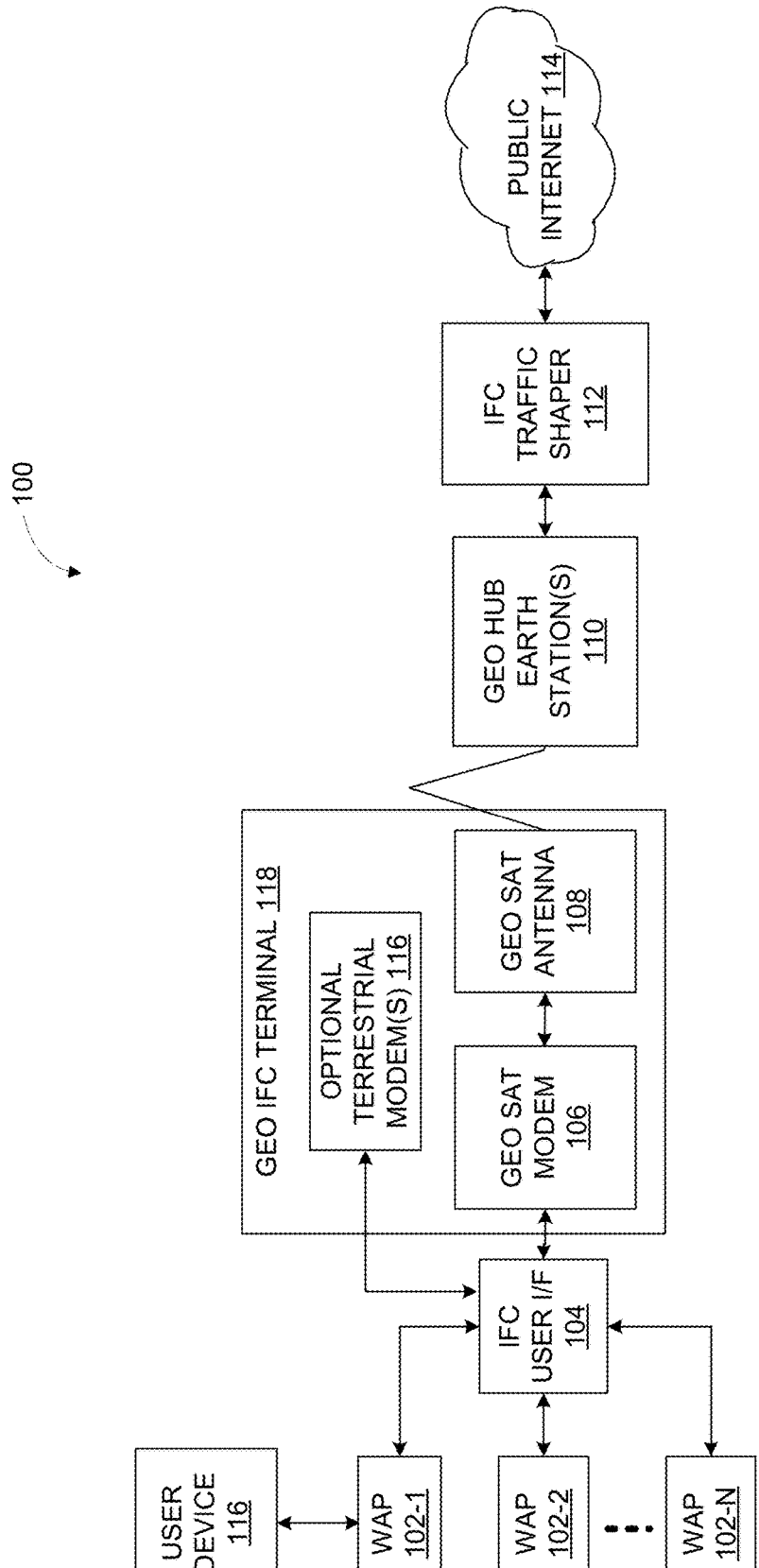
FIG. 1 illustrates a block diagram representation of a conventional Geosynchronous (GEO) satellite-based In-Flight Connectivity (IFC) architecture.
Figure 2:
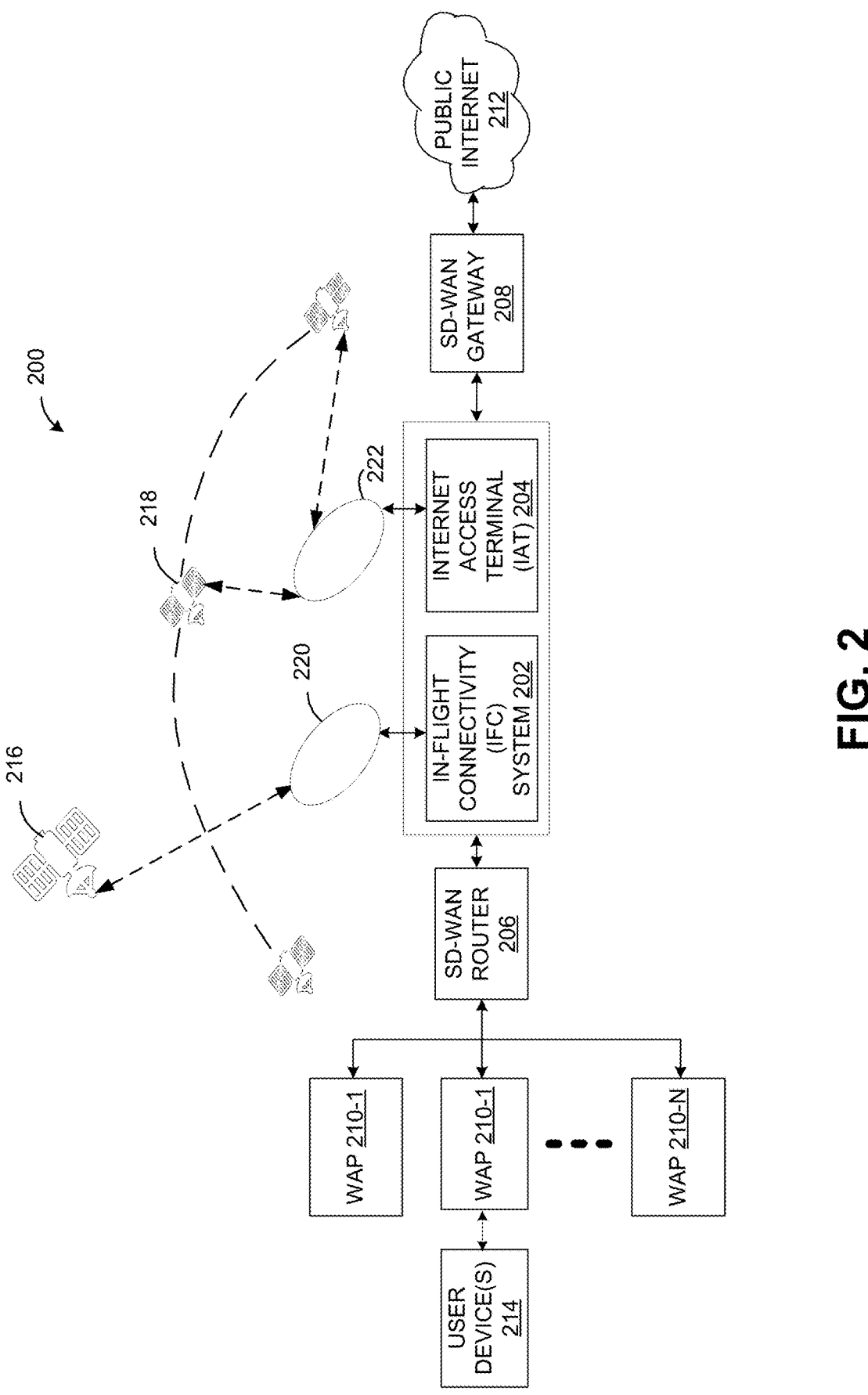
FIG. 2 illustrates a block diagram representation of a network architecture for a system for integrating multi-path communication networks to provide in-flight IP connectivity
Figure 3:
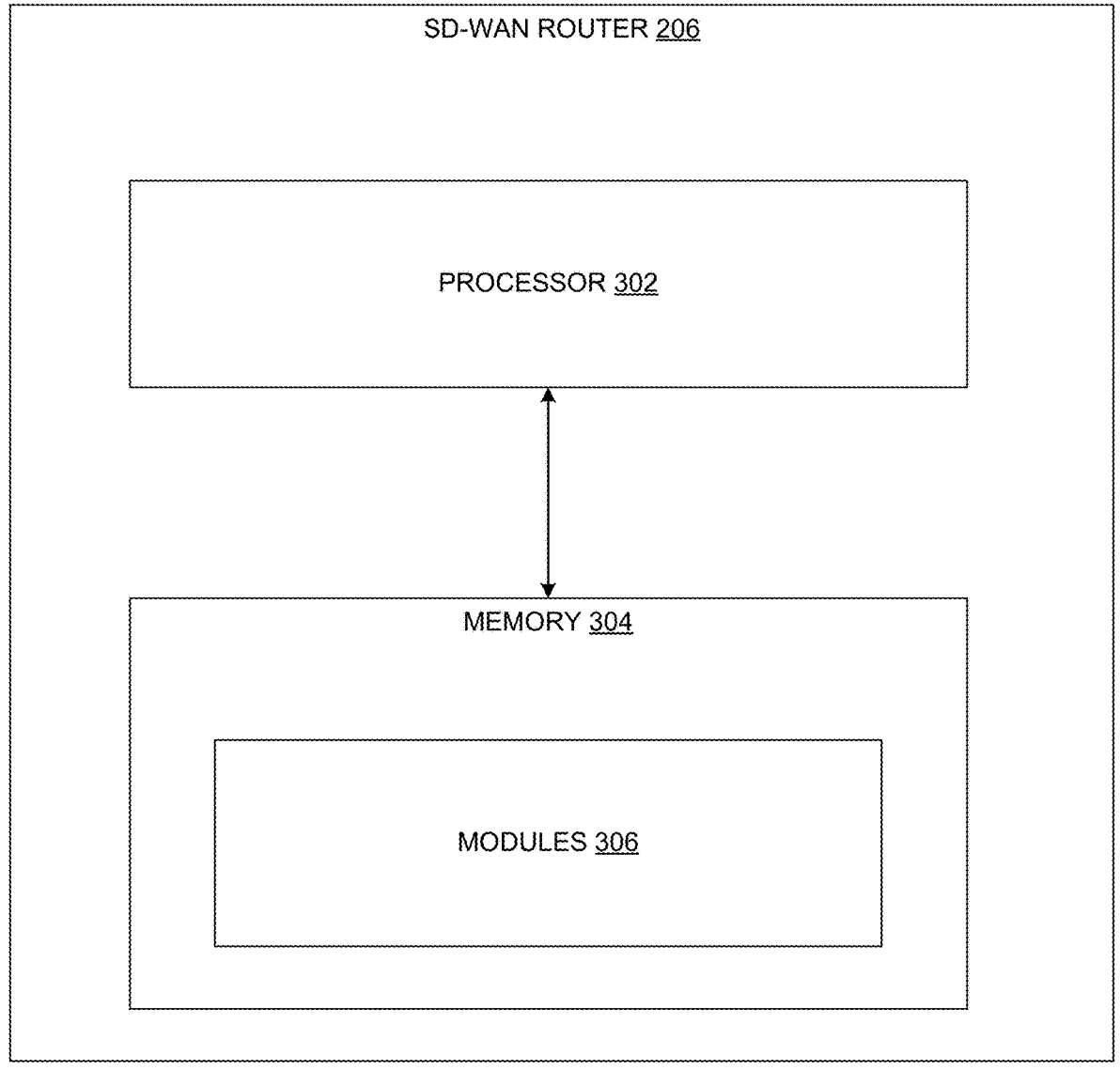

FIG. 3 illustrates a block diagram representation of a Software-Defined Wide Area Network (SD-WAN) router such as those shown in FIG. 2, according to an example.

Figure 4:
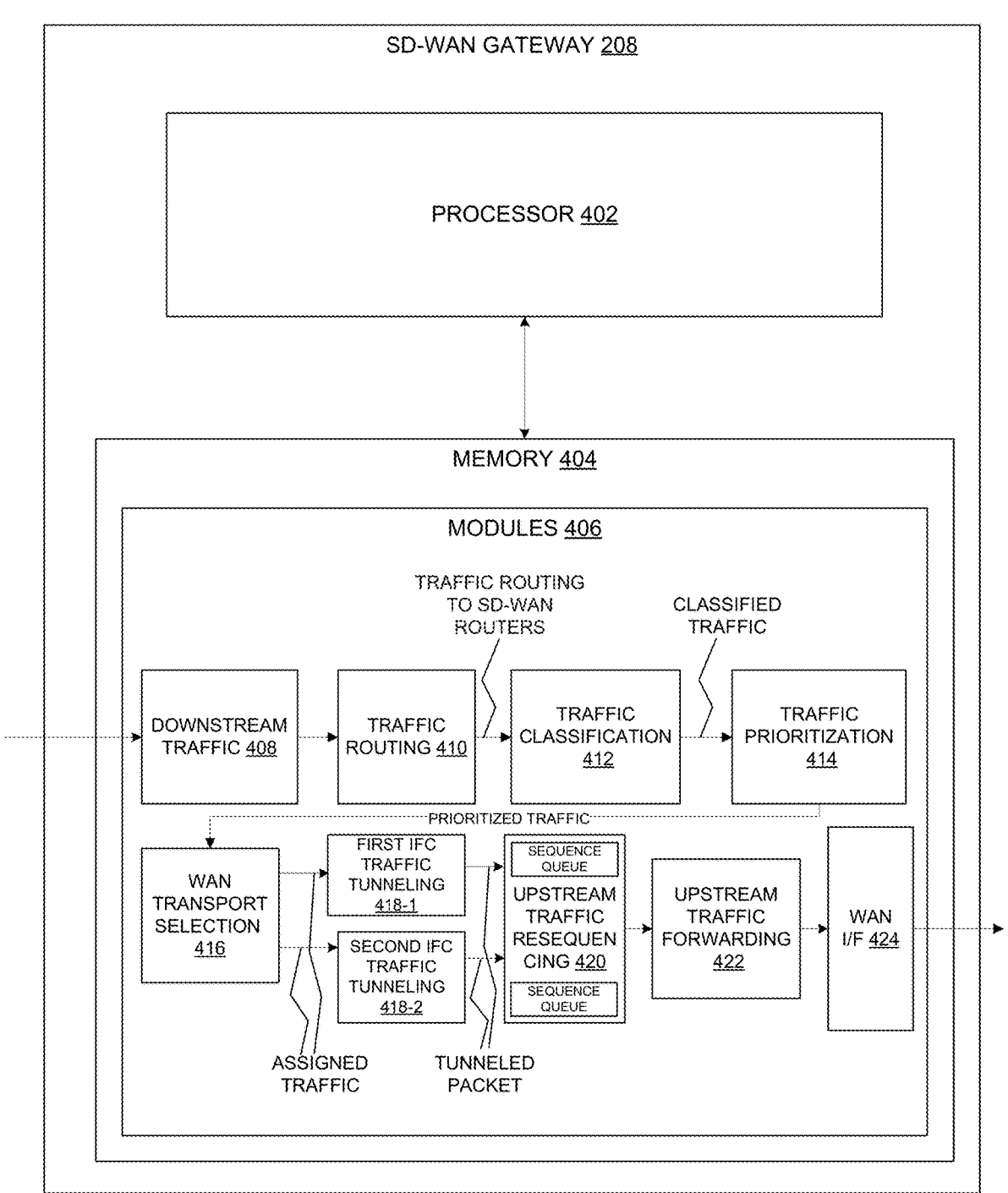

FIG. 4 illustrates a block diagram representation of a Software-Defined Wide Area Network (SD-WAN) gateway such as those shown in FIG. 2, according to an example.

Figure 5A:
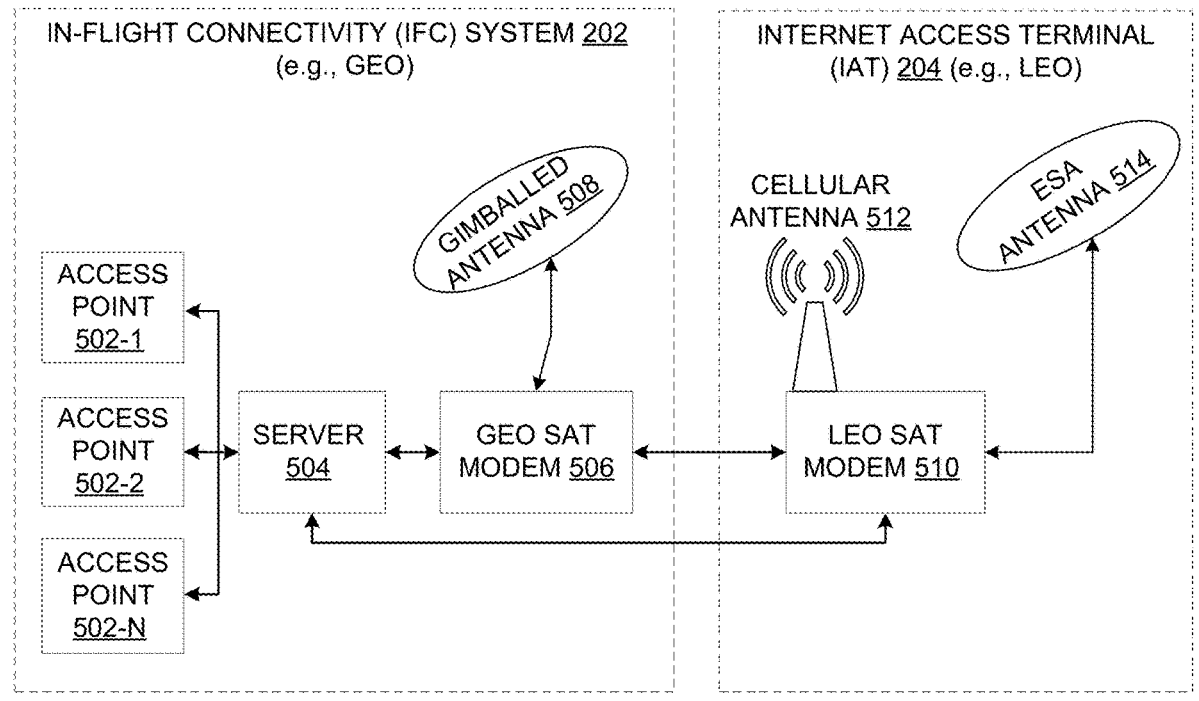
Figure 5B:
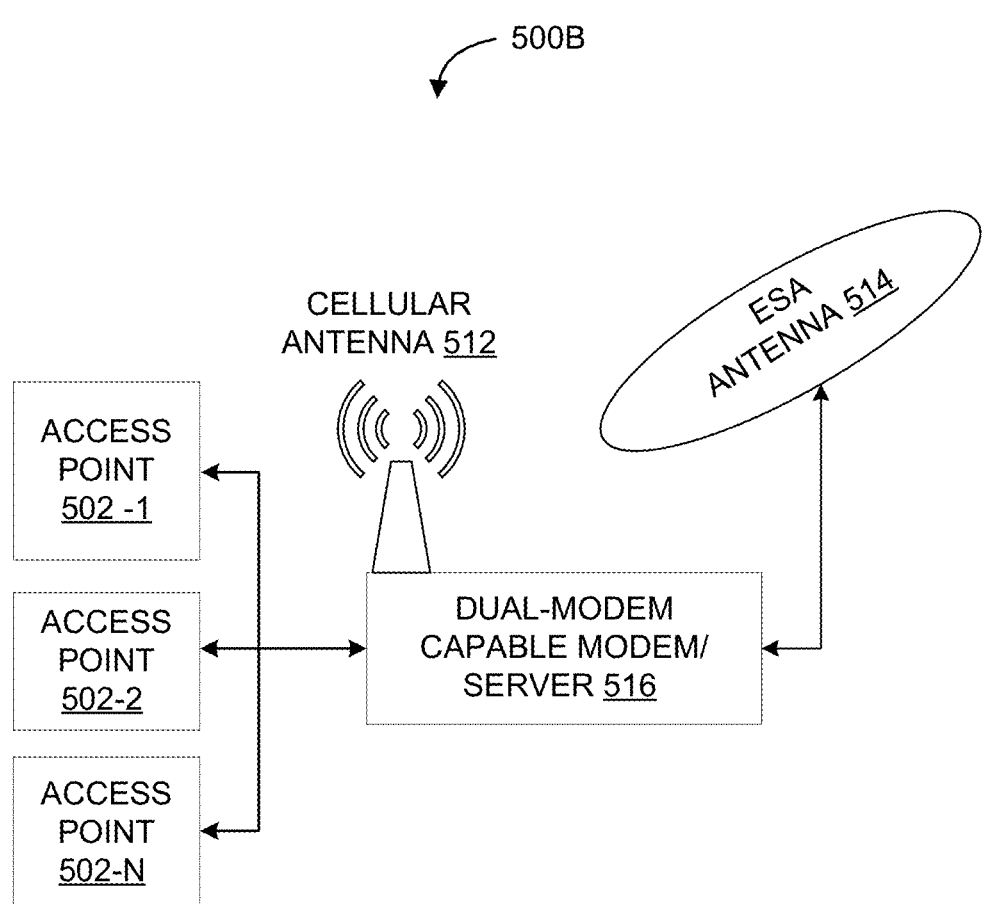

FIGS. 5A and 5B illustrate block diagram representations of an augmented mode of operation, and a stand-alone mode of operation, respectively, of a proposed system, according to an example.

Figure 6:
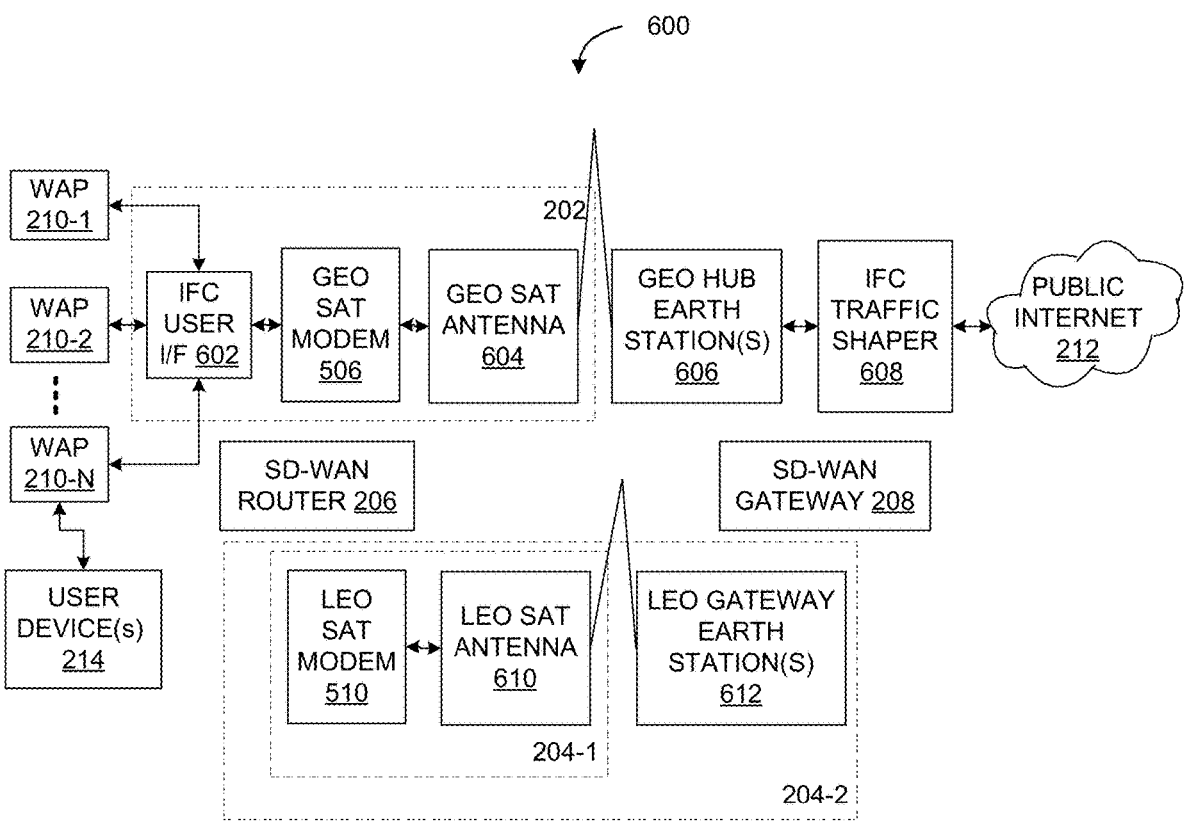

FIG. 6 illustrates a block diagram representation of a system, in which Geosynchronous (GEO) satellite network is integrated with Low Earth Orbit (LEO) satellite network, using SD-WAN combining techniques of the proposed system, according to an example.

Figure 7:
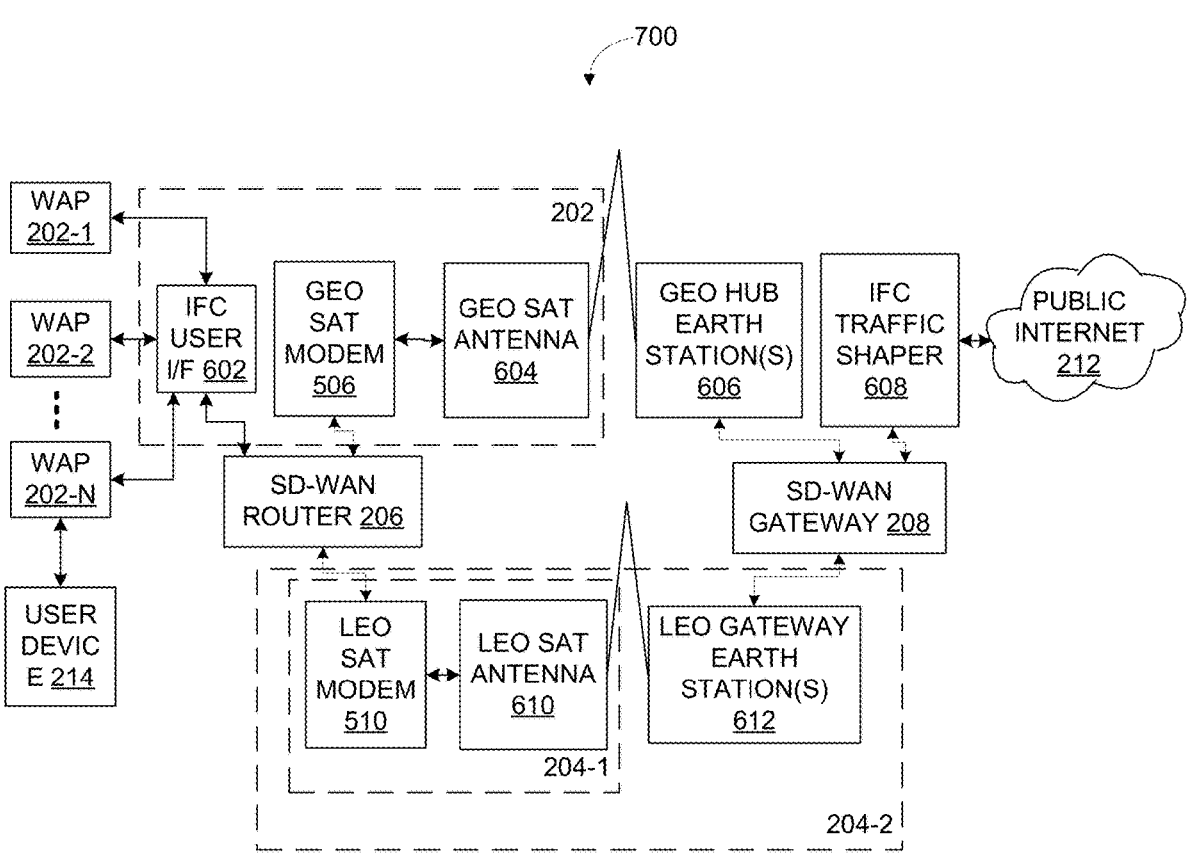

FIG. 7 illustrates a block diagram representation of a system, in which a Software-Defined Wide Area Network (SD-WAN) is integrated into GEO satellite network, according to an example.

Figure 8:
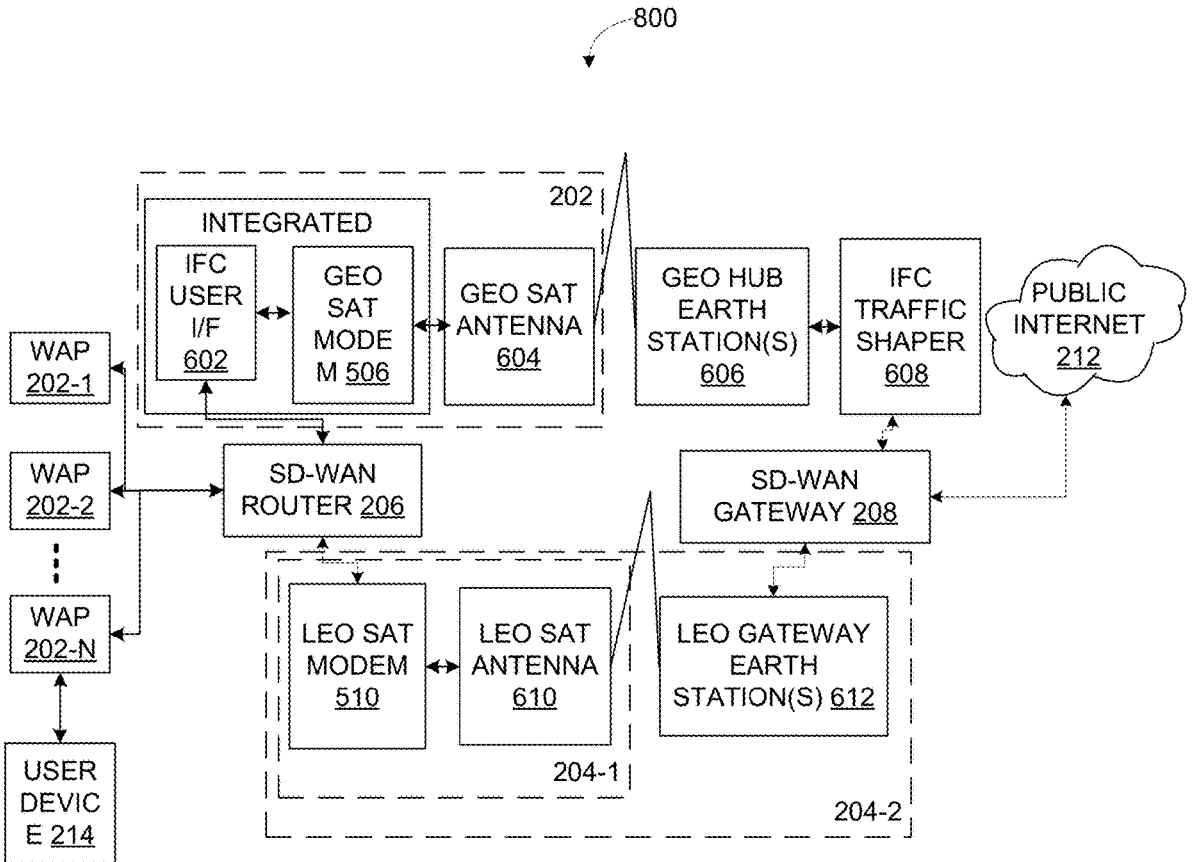

FIG. 8 illustrates a block diagram representation of a system, in which the SD-WAN is integrated into an In-Flight Connectivity (IFC) interface associated with the GEO satellite network, according to an example.

Figure 9A:
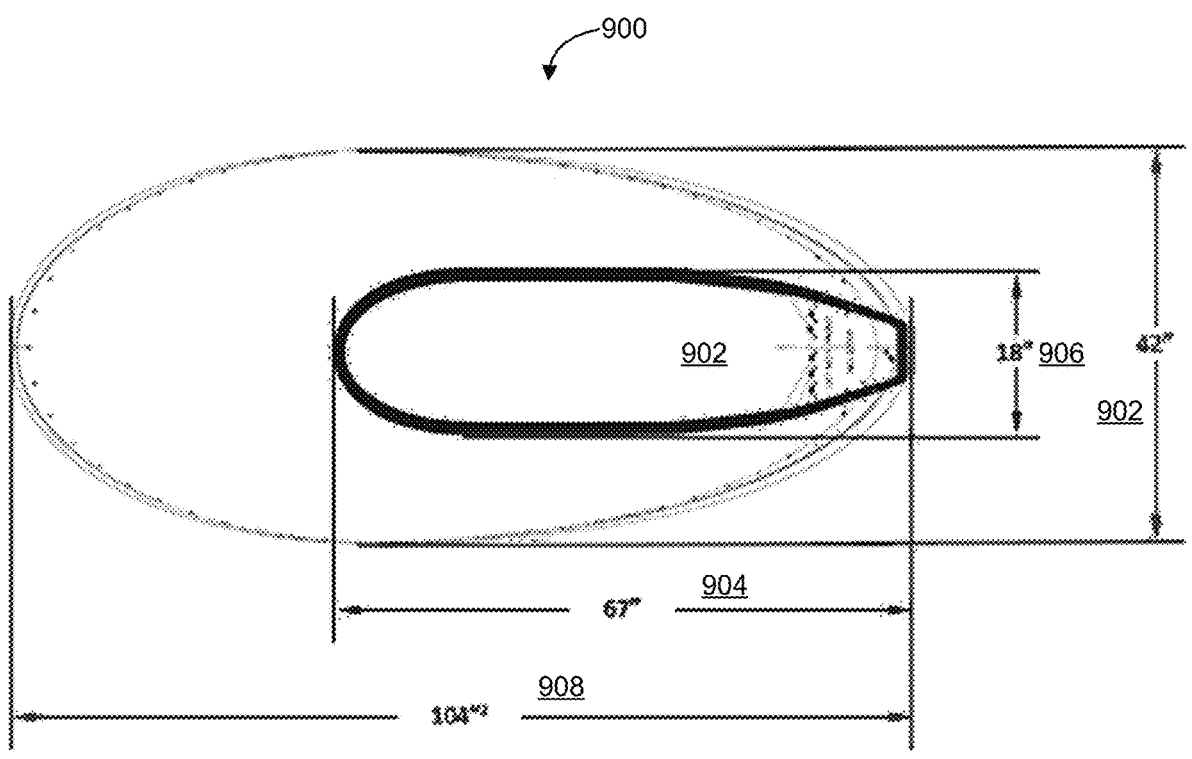
Figure 9B:
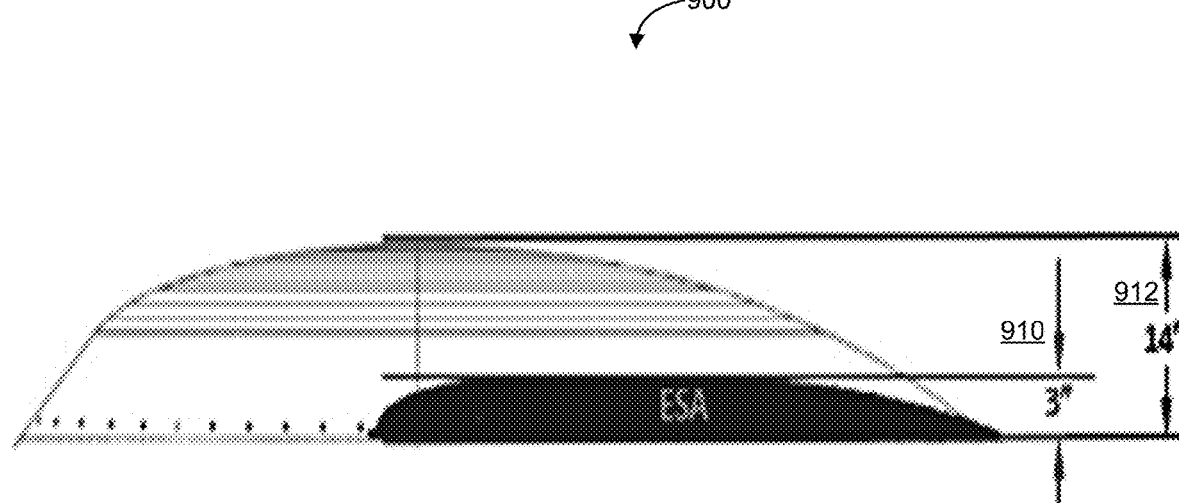

FIG. 9A and FIG. 9B illustrate schematic diagram representations of a LEO antenna and a thickness dimension of the LEO antenna, respectively, according to an example.

Figure 10A:
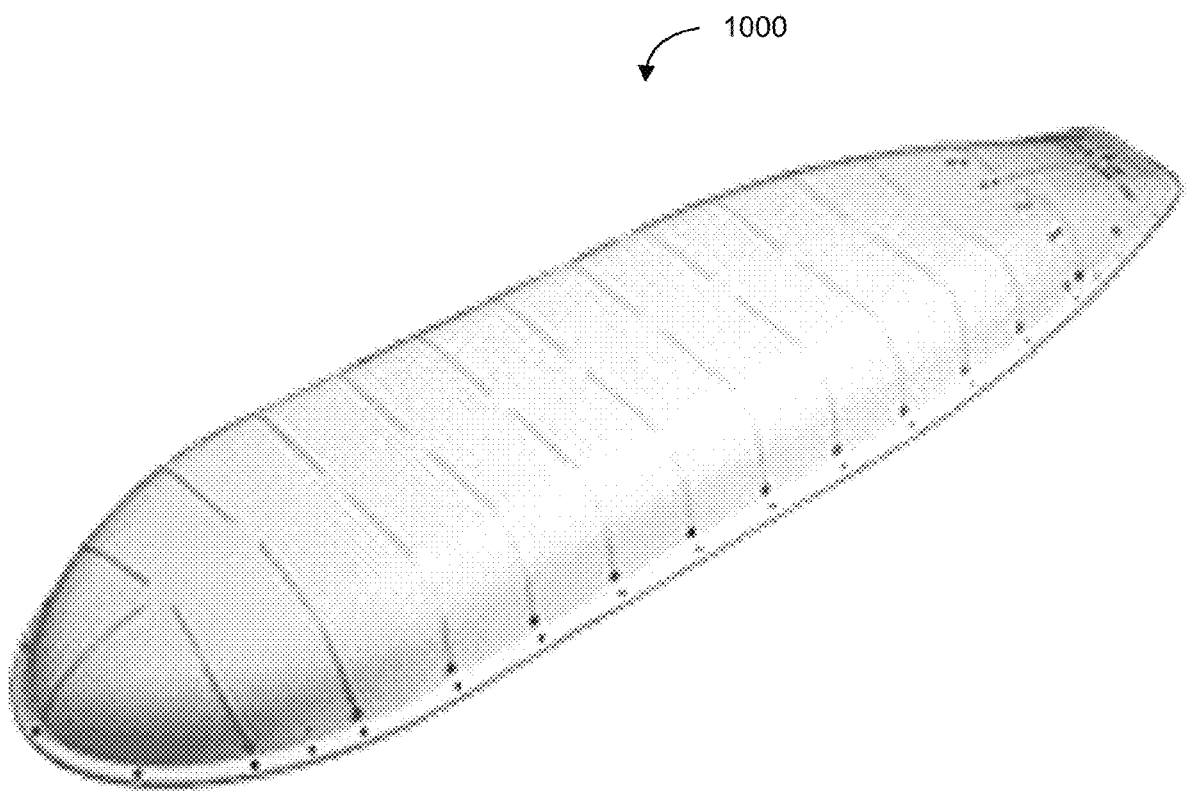
Figure 10B:
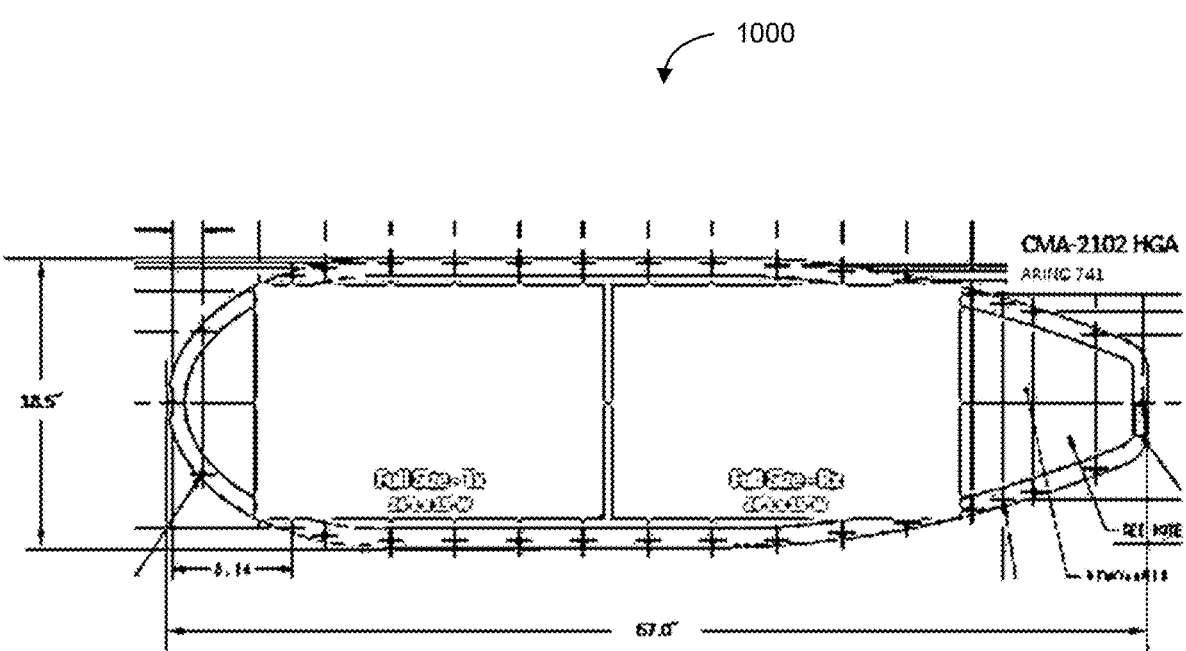

FIG. 10A and FIG. 10B illustrate schematic diagram representations of a narrow Electrically Steered Antenna (ESA), and dimensions of the narrow ESA, respectively, according to an example.

Figure 11:
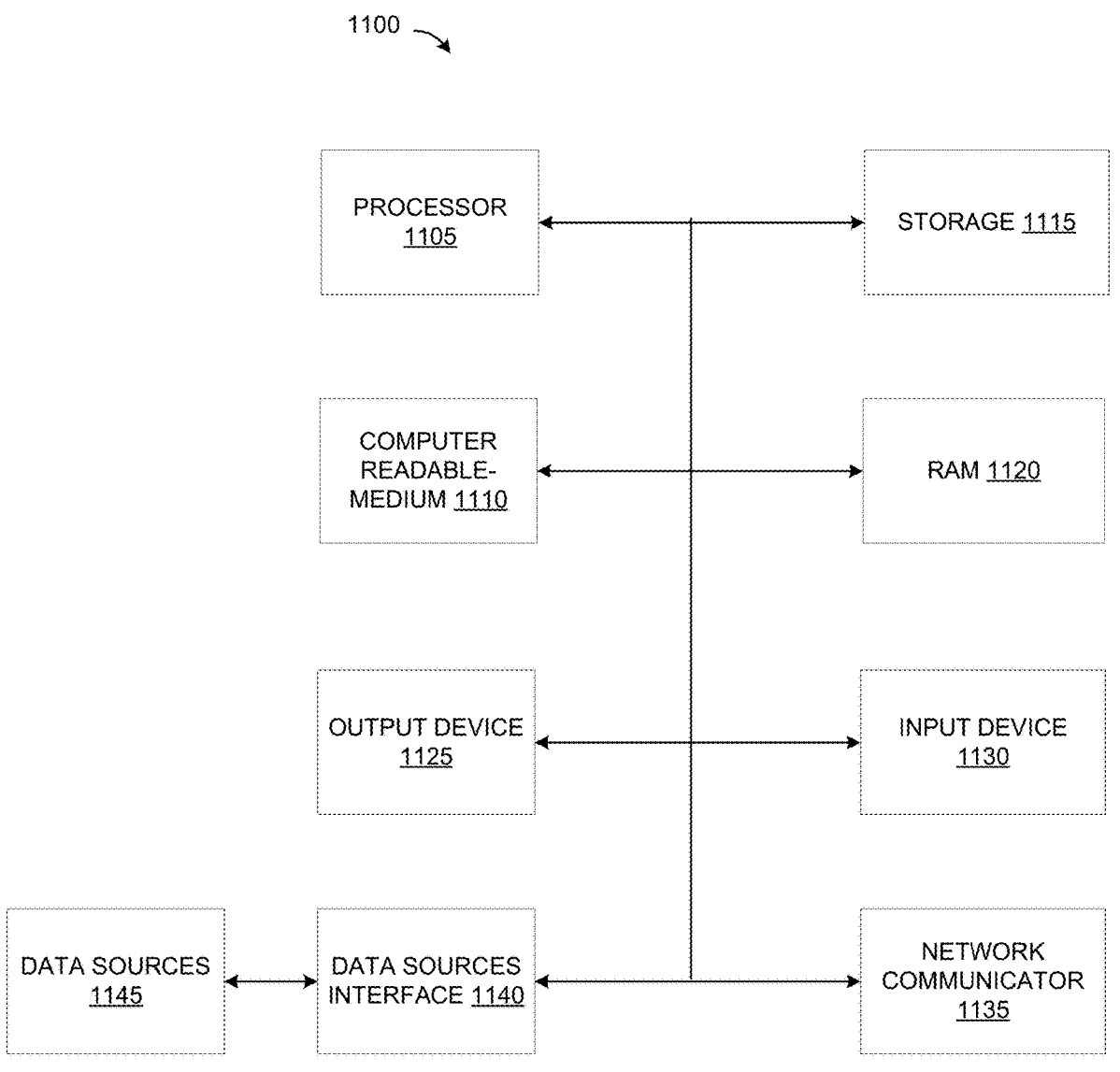

FIG. 11 illustrates a block diagram representation of a hardware platform for implementation of a computer system, according to an example.

FIG. 12 illustrates a flow diagram representation of a method for integrating multi-path communication networks to provide in-flight IP connectivity for users, by augmenting data streams from multi-path satellite networks, according to an example.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the examples of the present disclosure so as not to obscure the figures with details that will be readily apparent to those skilled in the art having the benefit of the description herein.

DETAILED DESCRIPTION

For simplicity and illustrative purposes, the proposed approach and solutions are described by referring mainly to examples and embodiments thereof. In the following description, numerous specific details are set forth in order to provide a thorough understanding of the proposed approach and solutions. It will be readily apparent, however, that the proposed approach and solutions may be practiced without limitation to these specific details. In other instances, some methods and structures readily understood by one of ordinary skill in the art have not been described in detail so as not to unnecessarily obscure the ongoing description. As used herein, the terms "a" and "an" are intended to denote at least one of a particular element, the term "includes" means includes but not limited to, the term "including" means including but not limited to, and the term "based on" means based at least in part on, the term "based upon" means based at least in part upon, and the term "such as" means such as but not limited to. The term "relevant" means closely connected or appropriate to what is being performed or considered.

The terms "comprise", "comprising", or any other variations thereof, are intended to cover a non-exclusive inclusion, such that one or more devices or sub-systems or elements or structures or components preceded by "comprises . . . a" does not, without more constraints, preclude the existence of other devices, sub-systems, additional sub-modules.

A computer system (standalone, client or server computer system) configured by an application may constitute a "module" (or "subsystem") that is configured and operated to perform certain operations. In one example, the "module" or "subsystem" may be implemented mechanically or electronically, so a module includes dedicated circuitry or logic that is permanently configured (within a special-purpose processor) to perform certain operations. In another example, a "module" or "subsystem" may also comprise programmable logic or circuitry (as encompassed within a general-purpose processor or other programmable processor) that is temporarily configured by software to perform certain operations.

Accordingly, the term "module" or "subsystem" should be understood to encompass a tangible entity, be that an entity that is physically constructed permanently configured (hardwired) or temporarily configured (programmed) to operate in a certain manner and/or to perform certain operations described herein.

Unless otherwise defined, all technical and scientific terms used herein have the same meaning as commonly understood by those skilled in the art to which this disclosure belongs. The system, methods, and examples provided herein are only illustrative and not intended to be limiting.

In some implementations, networking devices may manage traffic over multiple Wide Area Network (WAN) transport modems, for example, different physical network interfaces or physical connections, to provide high performance in different scenarios. Multiple network transport modems may be used concurrently, with devices selecting the network transport modem to be used for each packet or group of packets according to the requirements of requesting applications. For example, a network device may include a classifier that classifies packets as an interactive traffic (e.g., web pages) or a bulk traffic (e.g., streaming media, file downloads, and/or other file types). The network device may then select a best available network transport path/modem for each type of the traffic and use the selected transport modem to transmit the data.

As an example, a router may have access to an In-Flight Connectivity (IFC) system and an Internet Access Terminal (IAT), with both being available concurrently and both providing different performance characteristics. The router may use a classifier to assign packets to be transmitted to different classes, for example, different classes of service, and then use the class assignments and expected latencies for transmission to select which network transport modem to use to transmit the packets. For example, the router may select, to send packets that are not sensitive to latency (e.g., bulk transfers) over the network transport modem having a lowest data usage cap, lowest cost, highest throughput, and/or other advantages. For packets that are very latency-sensitive, the router may select to send packets over a lowest-latency connection.

The multiple network transport modems and/or IFC systems may be available concurrently and the network device may concurrently use both transport modems and/or IFC systems. This may include splitting/combine a single Internet Protocol (IP) flow across/combine the multiple transport modems, which may often provide overall latency, throughput, and other performance results. Such network devices may establish a packet tunnel for each different network transport modem and tunneled packets may include resequencing information, such as an IP flow identifier and a sequence number indicating a position of the packet in the sequence. At the receiving side, the packets received through multiple tunnels may be "un-tunneled" and the various IP flows may be reconstructed based on re-sequencing of the information.

The selection of a network transport modem and/or IFC systems may be performed at a fine-grained level, e.g., for each packet or group of packets. The selection of a network transport modem for a given packet may also account for dynamically changing network conditions of the associated communication network. Rather than simply assuming that the baseline or ideal conditions prevail for the different network transport modems and/or IFC systems, the network device may use observed and actual network conditions for the network transport modems and/or IFC systems to estimate the latency that would be experienced at that instant time and for the specific packet being processed.

The disclosed technology falls generally within the field of networking technology and deals with the subjects of: an Internet access, including with applications to Virtual Private Network (VPN) provided private networking, a WAN optimization, e.g., whereby existing Internet and VPN networking is optimized or improved to provide for Quality-of-Service (QoS) overlay which support with multiple classes of services across a broadband connection which does not support QoS itself, a satellite communications, e.g., where Geosynchronous (GEO) satellites may provide ubiquitous connectivity but operate with an order of magnitude higher latency than terrestrial network connectivity, where Low Earth Orbit (LEO) satellite may provide a low latency and high-speed data, and where Transmission Control Protocol (TCP) spoofing may be used to reduce the effect of latency on bulk transfer throughput, wireless cell phone-oriented networking, e.g., using technologies such as a terrestrial/non-terrestrial based fourth generation (4G), Long Term Evolution (LTE), fifth generation (5G), sixth generation (6G), and/or other terrestrial/non-terrestrial based technologies, to provide wireless connectivity to the Internet; Wide Area Networking (WAN), e.g., where multiple (typically two) broadband transports are combined to provide better service and availability than what is provided by either transport individually.

In an example, a continuity of a TCP connection may be optimized using a TCP Performing Enhancing Proxied (PEP'ed) technique. In an example, the PEP'ed TCP connections includes unacknowledged backbone connection packets that may be carried by a WAN transport that has entered an outage. In an example, the TCP performance enhancing proxied (PEP'ed) technique, involves terminating the TCP protocol in a software define wireless area network (SD-WAN) router and a SD-WAN gateway. Further, the TCP PEP'ed technique may carry the proxied TCP traffic across the WAN using a WAN-friendly backbone connection. When a WAN that was carrying traffic of the TCP PEP'ed connection, suffers an outage (or severely impaired ability to carry packets), any unacknowledged backbone connection packets are carried via one of the remaining WAN transport's tunnels. This ensures continuity across the frequent brief outages that occur in a mobility setting. This prevents an existing TCP PEP'ed connection from becoming "stuck" during such a single WAN outage. For example, Geosynchronous (GEO) satellites may provide ubiquitous connectivity, however, operate with an order of magnitude higher latency than terrestrial network connectivity and where TCP PEP'ed may be used to reduce the effect of latency on bulk transfer throughput.

The techniques described herein may be referred to as an In-Flight Connectivity (IFC) feature that may be used in acceleration appliances and other WAN optimization technologies. As discussed below, the system may adaptively switch between using satellite-based network access technology and other network access technology (e.g., cellular network access, wired network access, and the like), or provide different types of traffic on the different access technologies, to achieve, for example, improved throughput, lower latency, lower cost, and other benefits.

The present disclosure provides a system for integrating multi-path communication networks to provide in-flight IP connectivity for users, by augmenting data streams from multi-path satellite networks. The system includes an In-Flight Connectivity (IFC) system. The IFC system provides wireless network connectivity to a plurality of user devices. Further, the system includes an Internet Access Terminal (IAT). Furthermore, the system includes a Software-Defined Wide Area Network (SD-WAN) router communicatively coupled to the IFC system and the IAT. The SD-WAN router receives a request for accessing a Wide Area Network (WAN) from the plurality of user devices. The plurality of user devices is connected to the WAN via a plurality of SD-WAN tunnels. The request includes a plurality of data packets. The IAT 204 uses Ethernet cabling or switches to connect to the SD-WAN router or the IFC system 202.

Further, the SD-WAN router determines a plurality of parameters associated with the plurality of data packets based on the received request. The plurality of parameters includes one of latency parameters, a class of service, user authorization levels, and service plans. The SD-WAN router classifies the plurality of data packets into a plurality of traffic types based on the determined plurality of parameters. The plurality of traffic types includes one of a latency sensitive type, and a bulk type. Furthermore, the SD-WAN router prioritizes the plurality of data packets based on the plurality of traffic types and an available network capacity for an upstream transmission of the plurality of data packets across the IFC system 202 and the IAT 204. Additionally, the SD-WAN router determines an appropriate Wide Area Network (WAN) transport path associated with a SD-WAN tunnel for the upstream transmission based on the plurality of traffic types and a plurality of performance parameters. The appropriate WAN transport path is determined from one of the IFC system 202, and the IAT 204. The plurality of performance parameters includes one of a class of service, a load balancing, network congestion, and a data marking. Further, the SD-WAN router transmits the plurality of data packets to the WAN over the determined WAN transport path.

Referring now to the drawings, and more particularly to FIG. 2 through FIG. 12, where similar reference characters denote corresponding features consistently throughout the figures, there are shown preferred examples, and these examples are described in the context of the following exemplary system and/or method.

FIG. 2 illustrates a block diagram representation of a network architecture for a system 200 for integrating multipath communication networks to provide in-flight IP connectivity for users, by augmenting data streams from multipath satellite networks, according to an example. According to FIG. 2, the system 200 may include an In-Flight Connectivity (IFC) system 202, an Internet Access Terminal (IAT) 204, a Software-Defined Wide Area Network (SD-WAN) router 206, a Software-Defined Wide Area Network (SD-WAN) gateway 208, one or more wireless access points 210-1, 210-2, . . . , 210-N (individually referred to as the WAP 210 and collectively referred to as the WAPs 210), a public Internet 212, and one or more user devices 214. In an example, the IFC system 202 with the Internet Access Terminal (IAT) 204 may be implemented in an aircraft to provide augmented wireless network connectivity to a plurality of user devices. In another example, when the IAT 204 is connected to Low Earth Orbit (LEO) gate way stations on the ground, then the IAT 204 may be referred to as an Internet Access Gateway System (IAGS).

In some examples, the network architecture for the system 200 may depict a satellite communication system capable of providing at least voice and/or data services. In some examples, the satellite communication may be a Geosynchronous (GEO) satellite system, a Medium Earth Orbit (MEO) satellite system, a Low Earth Orbit (LEO) satellite system, and/or other satellite systems, and combinations thereof. In one example, the system 200 may include the IFC system 202, the IAT 204, and the SD-WAN router 206. The IFC system 202, the IAT 204 may be connected using a network tunneling. The SD-WAN router 206 may use a different tunnel for each IFC system available. At least one packet is tunneled between the IFC system 202, the IAT 204, and the SD-WAN router 206 using a Network Address Translation (NAT) protocol.

For example, a first tunnel, a wireless path/tunnel (not shown in FIGS.) may be established for packets exchanged over the IFC system 202. A second tunnel, a satellite path/tunnel (not shown in FIGS.), may be established for packets exchanged over the IAT 204. The wireless path/tunnel, and the satellite tunnel may represent the ability of the SD-WAN router 206, to forward packets to the IFC system 202 and/or the IAT 204.

In an example, the IFC system 202 may correspond to a Geosynchronous Earth Orbit (GEO) satellite system 216 based IFC system, and the IAT 204 may correspond to a mobile wireless modem/terminal (not shown) or Low Earth Orbit (LEO) satellite system 218-based Internet Access Terminal (IAT) 204. In an example, the IFC system 202 may include an In-Flight Connectivity (IFC) antenna unit 220, and the IAT 204 may include an IA antenna unit 222. The IFC antenna unit 220 and the IA antenna unit 222 may include, but is not limited to, one or more electrically steered antennas (also known as phased array antennas), a single/bi-directional antenna, and/or dual receivers, and the like. Although, the IFC system 202 and the IAT 204 may typically remain in the same location once mounted, the IFC systems may be removed from their mounts, relocated to another location, and/or may be configured to be mobile terminals. For example, the IFC systems may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other types of vehicles/transporting means. It should be appreciated that such IFC systems may be transportable (mobile) terminals that remain operational during transit.

In an example, the system 200 may be implemented as a standalone device such as a networking apparatus or device.

In another example, each of the IFC system 202, the IAT 204, and the SD-WAN router 206 may be implemented as a standalone device. In yet another example, the IFC system 202, the IAT 204, and the SD-WAN router 206 may be implemented and integrated into an existing network device/network apparatus such as a mobile terminal. The mobile terminal may be used due to more frequent occurrence of outages on one or more wide area network (WAN) connections due to the signal being physically blocked or interfered with (e.g. tunnels, tall buildings, hills, and mountains, and/or other obstacles), brief outages occurring when shifting from one spot beam to another spot beam, and/or one satellite to another satellite, or one wireless cell to another wireless cell, variations in performance including capacity when shifting from one spot beam to another spot beam, and/or one satellite to another satellite, or one wireless cell to another wireless cell, variations in performance including capacity when the mobile terminal moves from an edge to a center of a spot beam or vice a versa, and/or other mobility scenarios.

The network architecture for the system 200 may include other system elements or components and is not limited to the components shown in FIG. 2. For example, the system may include a second network transport modem with a directional antenna, a second network transport modem with a single antenna and a dual receiver, a processor, and a memory comprising modules. The disclosed technology may be implemented in different ways as shown in FIGS. 3 to 8 (systems 206, 208, 500A, 500B, 600, 700, and 800).

It should be appreciated that the network architecture 200 and the system(s) are depicted in FIGS. 3-8 may be a few example implementations. Hence, the network architecture 200 may or may not include additional features and some of the features described herein may be removed and/or modified without departing from the scope of the network architecture 200 outlined herein.

In some examples, the network architecture for the system 200 may also include a private network and/or public network (not shown in FIGS.). The private network and/or public network may include any variations of networks. For example, the private network may be a Local Area Network (LAN), and the public network may be a Wide Area Network (WAN). Also, the private network and/or public network may each be a Local Area Network (LAN), Wide Area Network (WAN), the Internet, a cellular network, a cable network, a satellite network, or other network that facilitates communication between the components of system 200 as well as any external element or system connected to the private network and/or public network. The private network and/or public network may further include one, or any number, of the exemplary types of networks mentioned above operating as a stand-alone network or in cooperation with each other. For example, the private network and/or public network may utilize one or more protocols of one or more clients or servers to which they are communicatively coupled. The private network and/or public network may facilitate the transmission of data according to a transmission protocol of any of the devices and/or systems in the private network and/or public network. Although each of the private network and/or public network may be a single network, it should be appreciated that in some examples, each of the private network and/or public network may include a plurality of interconnected networks as well.

Further, the network architecture for the system 200 may include terminals (not shown in FIGS.) which may be used by, but is not limited to, a user, a customer, an administrator, a network operator, a flight/ship operator, a driver, and/or type of users. Depending on the application, the terminals may include or incorporate any number of antenna dishes, which may be provided in various sizes, depths, or dimensions (e.g., small, medium, or large). Although the terminals may typically remain in the same location once mounted, the terminals may be removed from their mounts, relocated to another location, and/or may be configured to be mobile terminals. For example, the terminals may be mounted on mobile platforms that facilitate transportation thereof from one location to another. Such mobile platforms may include, for example, any number of mobile vehicles, such as airplanes, cars, buses, boats, trucks, troop-carriers, or other vehicles, and/or other type of vehicles/commuting means. It should be appreciated that such terminals may be transportable (mobile) terminals that remain operational during transit. As used herein, the terms "terminal," "customer terminal," "satellite terminal," and/or "hub stations" may be used interchangeably to refer to these terminal types.

It should be appreciated that any number of user devices 214 may be communicatively coupled to the terminals. In some examples, the user devices 214 may include any number of computing or mobile devices. For example, such a computing or mobile device may include, but is not limited to, a laptop, a tablet, a mobile phone, a payment terminal, an appliance, a camera, a sensor, a thermostat, a display, and/or other interfaces. In general, the user devices 214 may be connected to, but not limited to, any number of network-enabled computing devices, elements, or systems. It should be appreciated that a network of such devices may be commonly referred to as "Internet of Things" (IoT). The terminals may be provided as a standalone, transport integrated, hybrid integrated, or fully integrated single device solution. In the standalone configuration, all WAN modems and accelerators may be provided as standalone devices.

Further, the network architecture for the system 200 may include a satellite (not shown in FIGS.) which may be an object intentionally placed into orbit. In some examples, the satellite may be an artificial satellite that may be configured to transmit and receive data signals. For example, the satellite may from one or more beams (e.g., spot beams) and provide connectivity between at least the terminals and the SD-WAN gateway 208. More specifically, the satellite may communicate data signals using these beams with the terminals via a terminal return channel and a terminal forward channel, and with the gateway via a gateway return channel and a gateway forward channel (not shown). It should be appreciated that the satellite may from any number of beams to communicate data signals with any number of components, even beyond the terminals or the gateway.

In some examples, the satellite may be a communication satellite, such as a GEO satellite, MEO satellite, LEO satellite, and the like. In some examples, the satellite may include, but is not limited to, a transponder satellite, a regenerative satellite, and/or other similar satellite that may generate one or more spot beams. Furthermore, in some examples, the satellite may operate in geosynchronous, mid-earth, low-earth, elliptical, or some other orbital configuration. For example, a Geostationary Earth Orbit (GEO) spot beam, a Low-Earth Orbit (LEO) spot beam, a Medium Earth Orbit (MEO) spot beam, and/or other type of spot beam.

While the processors, components, elements, systems, subsystems, and/or other computing devices may be shown as single components or elements, one of ordinary skill in the art would recognize that these single components or elements may represent multiple components or elements and that these components or elements may be connected via one or more networks. Also, middleware (not shown) may be included with any of the elements or components described herein. The middleware may include software hosted by one or more servers. Furthermore, it should be appreciated that some of the middleware or servers may or may not be needed to achieve functionality. Other types of servers, middleware, systems, platforms, and applications not shown may also be provided at the front-end or back-end to facilitate the features and functionalities of the network architecture for the system 200, and components, as shown in FIGS. 2-8.

In an example, the system 200 may configure the IFC system 202 to provide wireless network connectivity to the one or more user devices 214. The system 200 may configure the IAT 204 to provide augmented wireless network connectivity to the one or more user devices 214. Further, the SD-WAN router 206 may be communicatively coupled to the IFC system 202 and the IAT 204.

In an example, the system 200 may execute the SD-WAN router 206 to receive a request for accessing a Wide Area Network (WAN) from the plurality of user devices 214. The plurality of user devices 214 may be connected to the WAN via a plurality of SD-WAN tunnels. Further, the request may include a plurality of data packets.

In an example, the system 200 may execute the SD-WAN router 206 to determine a plurality of parameters associated with the plurality of data packets based on the received request. The plurality of parameters may include, but not limited to, one of latency parameters, a class of service, user authorization levels, service plans, and the like.

In an example, the system 200 may execute the SD-WAN router 206 to classify the plurality of data packets into a plurality of traffic types based on the determined plurality of parameters. The plurality of traffic types may include, but not limited to, one of a latency sensitive type, a bulk type, and the like.

In an example, the system 200 may execute the SD-WAN router 206 to prioritize the plurality of data packets based on the plurality of traffic types and an available network capacity for an upstream transmission of the plurality of data packets across the IFC system 202 and the IAT 204.

In an example, the system 200 may execute the SD-WAN router 206 to determine an appropriate Wide Area Network (WAN) transport path (i.e., the WAP 210) associated with a SD-WAN tunnel for the upstream transmission based on the plurality of traffic types and a plurality of performance parameters. The appropriate WAN transport path may be determined from one of the IFC system 202 and the IAT 204. The plurality of performance parameters may include, but not limited to, one of a class of service, a load balancing, network congestion, a data marking, and the like. In an example, the system 200 may execute the SD-WAN router 206 to transmit the plurality of data packets to the WAN over the determined WAN transport path.

In an example, the system 200 may include an IFC user Interface (I/F) (not shown) communicatively coupled to the plurality of user devices 214 via the Wireless Access Point (WAP) 210 and the SD-WAN router 206. The IFC system 202 may be communicatively coupled to the IFC user interface via the SD-WAN router 206. The IFC system 202 may include an in-Flight Connectivity (IFC) modem communicatively coupled to the SD-WAN router 206 and the IFC antenna unit 220. Further, the IFC system 202 may include an In-Flight Connectivity (IFC) hub earth station (not shown in FIG. 2) communicatively coupled to the IFC antenna unit 220. Additionally, the IAT 204 may be communicatively coupled to the IFC user interface via the SD-WAN router 206. The IAT 204 may include a IA modem (not shown in FIG. 2) communicatively coupled to the SD-WAN router and the IA antenna unit 222. Further, an IA gateway earth station may be communicatively coupled to the IA antenna unit 222. Further, the system 200 may include an IFC traffic shaper unit (not shown in FIG. 2) communicatively coupled to the IFC system 202 and the IAT 204 via the SD-WAN gateway 208. The IFC traffic shaper unit may be connected to the WAN.

In an example, each of the SD-WAN router 206 and the SD-WAN gateway 208 may include a set of SD-WAN tunnels assigned to each of the plurality user devices 214. The plurality of user devices 214 may be identified by a downstream Internet Protocol (IP) assigned with an IP address. Each of the SD-WAN router 206 and the SD-WAN gateway 208 may perform traffic shaping using the set of SD-WAN tunnels and by determining a load-balancing traffic across each of the set of SD-WAN tunnels.

The examples of the systems and methods herein may be used in mobile Internet access, including with applications to a Virtual Private Network (VPN) provided private networking. Further, systems and methods herein may enable WAN optimization, in which existing Internet and VPN networking may be optimized or improved to provide for a Quality-of-Service (QoS) overlay which supports multiple classes of services. Furthermore, systems and methods herein may be used in mobile satellite communications. For example, where GEO satellites may provide ubiquitous connectivity, however, operate with an order of magnitude higher latency than non-terrestrial network connectivity. Additionally, systems and methods herein may be used in wireless cell phone-oriented networking, using technologies such as a non-terrestrial fifth generation (5G), a non-terrestrial sixth generation (6G), a non-terrestrial new radio (NR), to provide wireless connectivity via Internet to the user device(s) 110. Further, the systems and methods herein may be used in the SD-WAN technologies, where multiple (typically two) broadband transport modems are combined to provide better service and availability than what is provided by either transport individually. The SD-WAN technologies refers to a communication system in which components that have traditionally been implemented in hardware, such as mixers, filters, amplifiers, modulators, and demodulators, are instead implemented using software on mobile terminals. This approach provides flexibility, reconfigurability, and programmability to radio systems.

FIG. 3 illustrates a block diagram representation of the SD-WAN router 206 such as those shown in FIG. 2, according to an example. The SD-WAN router 206 may be communicatively connected to the IFC system 202 and/or the IAT 204 through a network (not shown). The network may be, for example, a satellite-based network and/or a wireless-based network. Further, the network may include a public Internet 212 host. A remote LAN host (not shown) may communicate with the public Internet 212 host (and/or a private network host) via the network. The communication involves transmitting data over two different IFC systems, the IFC system 202 (e.g., GEO satellite system) accessed using a mobile GEO modem (not shown) and the IAT 204 (e.g., LEO, wireless technologies, LTE, 4G, 5G, 6G, NR) accessed using a mobile LEO/wireless modem (not shown). However, the use of the two concurrent connections may be transparent to the remote LAN host. The remote LAN host may be a host device or endpoint, such as a desktop computer, a laptop computer, a tablet computer, and/or other electronic equipment, to which the SD-WAN router 206 and the SD-WAN gateway 208 provide public Internet access (for example to the public Internet 212 host via an Internet (not shown)) and private network access (for example to a private network host 132 via a private network intranet (not shown)). Additionally, there may be multiple such remote LAN hosts, all of which may concurrently receive network access through the SD-WAN router 206 and the remote LAN(s) (not shown). For example, additional remote LAN hosts may concurrently transmit and receive data through the SD-WAN router 206 along with the remote LAN host.

The SD-WAN router 206 may include a processor 302 and a memory 304 coupled to the processor 302. The memory 304 may include processor-executable instructions, which on execution, cause the processor 302 to perform one or more operations described herein. Further, the memory 304 may include a plurality of modules 306. The modules 306 may include, but are not limited to, a receiving module, a determining module, a classifying module, a prioritizing module, a transmitting module, and/or other modules. Each of these modules when executed by the processor 302 perform one or more functionalities described in the context of the systems 200, 206, 208, 500A, 500B, 600, 700, and 800.

For example, the receiving module may receive a request for accessing a Wide Area Network (WAN) from the plurality of user devices 214. The plurality of user devices 214 are connected to the WAN via a plurality of SD-WAN tunnels. The request includes a plurality of data packets.

In an example, the determining module may determine a plurality of parameters associated with the plurality of data packets based on the received request. The plurality of parameters includes, but not limited to, latency parameters, a class of service, user authorization levels, service plans, and the like. In an example, the classifying module may classify the plurality of data packets into a plurality of traffic types based on the determined plurality of parameters. The plurality of traffic types may include, but not limited to, a latency sensitive type, a bulk type, and the like. In an example, the prioritizing module may prioritize the plurality of data packets based on the plurality of traffic types and an available network capacity for an upstream transmission of the plurality of data packets across the IFC system 202 and the IAT 204.

In an example, the determining module may determine an appropriate Wide Area Network (WAN) transport path associated with a SD-WAN tunnel for the upstream transmission based on the plurality of traffic types and a plurality of performance parameters. The appropriate WAN transport path may be determined from one of the IFC system 202 and the IAT 204. Further, the plurality of performance parameters includes, but not limited to, a class of service, a load balancing, network congestion, a data marking, and the like. In an example, the transmitting module may transmit the plurality of data packets to the WAN over the determined WAN transport path.

In an example, the SD-WAN router 206 may re-sequence a tunneled downstream traffic corresponding to an Internet Protocol (IP) flow carried by the appropriate Wide Area Network (WAN) transport path. The tunneled downstream traffic includes a plurality of prioritized data packets. Further, the SD-WAN router 206 may forward the re-sequenced tunneled downstream traffic in a downstream transmission to the plurality of user devices 214.

In an example, the SD-WAN router 206 may be communicatively connected between the plurality of user devices 214 and a IFC user interface. The SD-WAN router 206 may be connected to the IFC system 202 via the IFC user interface and further connected to the IAT 204. The SD-WAN router 206 may authenticate the plurality of the user devices 214 using a set of credentials associated with each service plan. Further, the SD-WAN router 206 may allocate a separate tunnel for each set of credentials and assign a separate downstream IP address for each login. The SD-WAN router 206 and the SD-WAN gateway 208 may perform, but not limited to, an authentication, an authorization, a classification, and a traffic shaping functionality agnostic to a corresponding functionality associated with the IFC system 202. Further, the SD-WAN router 206 may determine a whitelist of domain names and IP addresses associated with an In-Flight Entertainment (IFE) traffic and forward the IFE traffic to the IFC user interface.

In an example, the SD-WAN router 206 may operate outside the IFC system 202 by using the IFC system 202 as a WAN transport. In this scenario, the SD-WAN router 206 may monitor a login process associated with each of the plurality of user devices 214. Further, the SD-WAN router 206 may tunnel the plurality of data packets upon a successful login process. The SD-WAN router 206 may operate at a Medium Access Control (MAC) level by forwarding an assignment of IP addresses to the plurality of user devices using a Dynamic Host Configuration Protocol (DHCP). Further, the SD-WAN router 206 may terminate the SD-WAN tunnel using a MAC address and the IP addresses of the plurality of user devices 214. The SD-WAN router may operate as the DHCP proxy by assigning a plurality of IP addresses to each of the plurality of user devices 214. Furthermore, the SD-WAN router 206 may operate as the routing hop by using a router MAC address and with an IP address for each of the plurality of user devices 214. Additionally, the SD-WAN tunneled traffic may be modified by using a plurality of headers in the SD-WAN tunnel. The modified SD-WAN traffic may correspond to a Virtual Private Network (VPN) traffic.

In an example, the SD-WAN router 206 may periodically generate an appropriate amount of data packets to measure a latency of the IFC system 202 and the IAT 204. Further, the SD-WAN router 206 may determine that the IFC system 202 is in use by determining that the measured latency of the IFC system 202 is above a threshold value. Further, the SD-WAN router 206 may determine that the IFC system 202 is in use by monitoring the appropriate amount of data packets passing through the SD-WAN router 206. Furthermore, the SD-WAN router 206 may determine that the IFC system 202 is in use by measuring a round-trip time with respect to a threshold round trip time. The SD-WAN router 206 may detect a transition of the IFC system 202 from a high-latency satellite link to a low-latency terrestrial link by transmitting the plurality of data packets via the set of SD-WAN tunnels and routing an upstream traffic and a downstream traffic via the IFC system 202. Further, by transmitting the plurality of data packets via the set of SD-WAN tunnels and routing the upstream traffic and the downstream traffic via the IFC system 202 until the IFC system 202 may determine to be congested. Furthermore, by performing load balancing of additional traffic across the IAT 204 upon determining that the IFC system 202 is congested.

In an example, the SD-WAN router 206 may bypass the set of SD-WAN tunnels and transmit the upstream traffic and the downstream traffic in an unmodified format via the IFC system 202 in an IFC insert network and a man-in-middle network. Furthermore, the SD-WAN router 206 may bypass the SD-WAN tunnels and transmit the upstream traffic and the downstream traffic in an unmodified format excluding a network address translation operation via the IFC system 202 in an overlay network.

In an example, the SD-WAN router 206 may detect a performance degradation level of the IFC system 202 based on the plurality of performance parameters and the available network capacity. Further, the SD-WAN router 206 may shift at least one of the upstream traffic and the downstream traffic away from the IFC system 202 to the IAT 204 based on the detected performance degradation level.

FIG. 4 illustrates a block diagram representation of a Software-Defined Wide Area Network (SD-WAN) gateway 208 such as those shown in FIG. 2, according to an example. The SD-WAN gateway 208 may be communicatively connected to the IFC system 202 and/or the IAT 204 through a network (not shown). The network may be, for example, a satellite-based network and/or a wireless-based network. Further, the network may include a public Internet 212 host. A remote LAN host (not shown) may communicate with the public Internet 212 host (and/or a private network host) via the network. The communication involves transmitting data over two different IFC systems, the IFC system 202 (e.g., GEO satellite system) accessed using a mobile GEO modem (not shown) and the IAT 204 (e.g., LEO, wireless technologies, LTE, 4G, 5G, 6G, NR) accessed using a mobile LEO/wireless modem (not shown). However, the use of the two concurrent connections may be transparent to the remote LAN host. The remote LAN host may be a host device or endpoint, such as a desktop computer, a laptop computer, a tablet computer, and/or other electronic equipment, to which the SD-WAN router 206 and the SD-WAN gateway 208 provide public Internet access (for example to the public Internet 212 host via an Internet (not shown)) and private network access (for example to a private network host 132 via a private network intranet (not shown)). Additionally, there may be multiple such remote LAN hosts, all of which may concurrently receive network access through the SD-WAN gateway 208 and the remote LAN(s) (not shown). For example, additional remote LAN hosts may concurrently transmit and receive data through the SD-WAN gateway 208 along with the remote LAN host.

The SD-WAN gateway 208 may include a processor 402 and a memory 404 coupled to the processor 402. The memory 404 may include processor-executable instructions, which on execution, cause the processor 402 to perform one or more operations described herein. Further, the memory 404 may include a plurality of modules 406. The modules 406 may include, but are not limited to, a receiving module, a determining module, a classifying module, a prioritizing module, a transmitting module, and/or other modules. Each of these modules when executed by the processor 402 perform one or more functionalities described in the context of the systems 200, 208, 500A, 500B, 600, 700, and 800.

For example, the receiving module may receive a plurality of data packets from the WAN for a downstream transmission (i.e., downstream traffic 408) to the plurality of user devices 214 over the plurality of SD-WAN tunnels. Further, the determining module may determine the plurality of parameters associated with the received plurality of data packets. Further, the determining module may determine a route the plurality of data packets to an appropriate SD-WAN router 206 (i.e., traffic routing 410). Further, the classifying module may classify the plurality of data packets into the plurality of traffic types based on the determined plurality of parameters (i.e., traffic classification 412). Further, the prioritizing module may prioritize the plurality of data packets based on the plurality of traffic types and the available network capacity for a downstream transmission of the plurality of data packets across the IFC system 202 and the IAT 204 (i.e., traffic prioritization 414). The determining module may determine the appropriate Wide Area Network (WAN) transport path associated with the SD-WAN tunnel for the downstream transmission of the plurality of data packets based on the plurality of traffic types and the plurality of performance parameters (i.e., a WAN transport selection 416). The appropriate WAN transport path may be determined from one of the IFC system 202 and the IAT 204. The transmitting module may transmit the plurality of data packets to the plurality of user devices over the determined WAN transport path via tunneling the plurality of data packets (i.e., a IFC traffic tunneling 418-1, and a IA traffic tunneling 418-2).

In an example, the SD-WAN gateway 208 may re-sequence a tunneled upstream traffic corresponding to an Internet Protocol (IP) flow carried by the appropriate Wide Area Network (WAN) transport path (i.e., upstream traffic resequencing 420). The tunneled upstream traffic includes prioritized plurality of data packets. Further, the SD-WAN gateway 208 may forward the re-sequenced tunneled upstream traffic in an upstream transmission (i.e., upstream traffic forwarding 422) to the WAN via the WAN interface 424.

In an example, the SD-WAN gateway 208 may be communicatively connected between the WAN and the IFC traffic shaper unit. The SD-WAN gateway 208 may be connected to the IFC system 202 via the IFC traffic shaper unit, and further connected to the IAT 204.

FIGS. 5A and 5B illustrate block diagram representations of a network architecture 500A and network architecture 500B for an augmented mode of operation, and a stand-alone mode of operation, respectively, of a proposed system, according to an example. FIG. 5A may depict a network architecture 500A for the augmented mode of operation, in which the IFC system 202 (e.g., GEO satellite system) may be integrated with the IAT 204 (e.g., LEO satellite system). The IFC system 202 in the network architecture 500A may include one or more access points 502-1, 502-3, . . . 502-N (hereinafter referred to as the access point 502), a server 504, a GEO Satellite (SAT) modem 506, and a gimballed antenna 508. For example, the access point 502 may be correspond the WAP 210, and the server 504 may correspond to an IFC user Interface (I/F). Further, for example, the gimballed antenna 508 may correspond to the IFC antenna or a GEO SAT antenna. Further, the IAT 204 in the network architecture 500A may include a LEO Satellite (SAT) modem 510. The LEO SAT modem 510 may communicate using a cellular antenna 512 and an Electrically Steered Antenna (ESA) 514.

For example, consider a scenario of network architecture with an existing IFC system. The existing IFC system may be integrated with a LEO IFC system in accordance with the network architecture 500A. The disclosed technology may transit from a traditional IFC system to the LEO terminal. This conversion involves optimizing data transmission and communication for facilitating the deployment and management of the technology stack for the existing IFC to the LEO terminal. In an example, the network architecture 500A may sort the transport of IP packets based on a pre-defined criterion. The network architecture 500A may determine whether to transmit IP packets over the existing GEO bearer or the new LEO bearer, to achieve low latency for real-time applications, and high-speed data transmission for connectivity performance.

In addition, the network architecture 500A may provide Service Level Agreement (SLA) compliance, even in areas with high IFC usage density. The disclosed technology may handle increased demand and maintain performance standards in crowded airspace or hubs. In another scenario, implementing a data traffic mixture may include, for example, as 85% GEO and 15% LEO. The network architecture 500A may dynamically adjust the traffic mixture based on changing conditions or requirements. Additionally, the network architecture 500A may enable reliable usage of Virtual Private Networks (VPNs) and cloud-based applications. This compatibility of the technology with modern connectivity needs, especially in the context of air travel where secure and reliable communication may be essential to the users.

Further, FIG. 5B may depict a network architecture 500B for the stand-alone mode of operation, in which the IAT 204 (e.g., LEO satellite system) may function in a stand-alone mode. The IAT 204 in the network architecture 500B may include the one or more access points 502-1, 502-3, . . . 502-N (hereinafter referred to as the access point 502), a dual-modem capable modem/server 516. The dual-modem capable modem/server 516 may correspond to LEO SAT modem. The dual-modem capable modem/server 516 may communicate using a cellular antenna 512 and an Electrically Steered Antenna (ESA) 514. The dual-modem capable modem/server implies that the modem may be capable of implementing two modem such as a GEO modem and a LEO modem.

In an example, the disclosed technology may be designed to remain relevant and adaptable to emerging advancements and changes in the communication network. The network architecture 500B may provide flexibility to accommodate upgrades and transitions to newer communication technologies without requiring extensive modifications or replacements. Further, the core communication technology may be modular, and a simple replacement of the existing component, which allows for a compatibility with the next-generation communication technologies. Further, the ESA 514 may be expected to remain unchanged during the upgrade. This indicates that the upgrade may be focused on the existing component, and other elements of the network architecture 500B, such as the ESA 514, may not require modification. The network architecture 500B may gradually allow migration to LEO stand-alone architecture. The network architecture 500B may allow for a gradual migration from a mixed GEO/LEO architecture to a LEO stand-alone architecture. This transition may be a stand-alone mode of operation, indicating that the network architecture 500B may operate in a fully LEO-based configuration when desired.

The gradual transition from GEO to LEO satellite network may provide efficient user experience to aircraft operators and airline decision-makers. The user experience may arise from the assurance that the disclosed technology may support a smooth migration, and concerns about the maturation of LEO technology are addressed. When the airline is ready to use the LEO stand-alone solution may be retained, and the heavy GEO solution may be removed. This removal is anticipated to reduce fuel and range penalties associated with carrying and operating the heavier GEO equipment. Additionally, maintenance of the equipment/terminal associated with the IFC system may be simplified by having fewer Line Replaceable Units (LRUs) to manage the communication network via the IFC system.

In an example, a GEO IFC system may sometimes include a broadband connection that can be used apart from the GEO satellite modem. These are used mostly when on the ground although some GEO IFC systems work with a ground-to-air WAN transport with coverage for a part of the path a flight takes. It is desirable to detect when the GEO IFC system is using such a connection. The SD-WAN router can achieve this in multiple ways including Periodically generating a small number of packets, such as ICMP pings, to measure latency determining that the GEO transport is in use when the measurements are consistently above a threshold (e.g., 500 ms). Monitoring a subset of passenger traffic passing thru the SD-WAN router and measuring the round-trip time. This can be done, for example, by measuring how long the SYN/SYNACK of a TCP connection takes to be completed or a TLS handshake. The GEO transport is deemed to be in use when the round-trip measurements are consistently above a threshold (e.g., 500 ms). A detected transition from a high-latency GEO link to a low-latency terrestrial link can be handled by the SD-WAN router in different ways: continue to use the SD-WAN tunnels but route all traffic (downstream and upstream) via the GEO IFC system. Continue to use the SD-WAN tunnels but route all traffic (downstream and upstream) via the GEO IFC system up until the GEO IFC system is deemed to be congested and then load balance additional traffic across the LEO terminal.

Bypass the SD-WAN tunnels and have the SD-WAN router send traffic unmodified thru the GEO IFC system. This will result in a momentary outage and loss of all existing passenger TCP and UDP connections which the user devices will have to reestablish. This method can be used with the SD-WAN LEO IFC Insert architecture and the SD-WAN LEO man-in-the-middle architecture but not with the SD-WAN LEO Overlay architecture. Bypass the SD-WAN tunnels and have the SD-WAN router send traffic unmodified except for a Network Address Translation (NAT) operation thru the GEO IFC system. This will result in a momentary outage and loss of all existing passenger TCP and UDP connections which the user devices will have to reestablish. This method can be used with the SD-WAN LEO Overlay architecture.

Similarly, there may be a scenario to detect when the GEO IFC system's transport is experiencing significant performance degradation and having the SD-WAN shift traffic away from that transport. Significant performance degradation can include measurable attributes such packet loss, loss of connectivity to the Hub Earth Station or loss of connectivity from the Hub Earth Station to the Public Internet, inadequate available capacity, and the like. The detection of a form of degradation triggers the SD-WAN to shift all traffic or selected appropriate traffic that can be expected to be impacted by the degradation away from the GEO IFC transport to the LEO transport. The same logic can be used to detect LEO performance degradation and to shift traffic away from the LEO transport to the GEO transport.

FIG. 6 illustrates a block diagram representation of a system 600, in which the Geosynchronous (GEO) satellite network is integrated with Low Earth Orbit (LEO) satellite network, using SD-WAN combining techniques of the proposed system 200, according to an example. The system 600 may include the IFC system 202 and the IAT 204. Further, the IFC system 200 may include the Wireless Access Points (WAPs) 202-1, 202-2, . . . 202-N (collectively referred to as the WAPs 202), an IFC user Interface (I/F) 602, the GEO Satellite (SAT) modem 506, a GEO SAT antenna 604, a GEO hub Earth station(s) 606, an IFC traffic shaper unit 608, and the public Internet 212. The WAPs 202 may provide Wireless Fidelity (Wi-Fi) connectivity to the user devices 214 associated with, for example, passengers of an airline from the IFC user I/F 602. The IFC user I/F 602 may provide access control (e.g., user login), traffic classification (such as traffic type, user authorization levels, and the like) and traffic shaping (prioritization, usage limits, and the like). The GEO SAT modem 506 may be communicatively coupled to the GEO SAT antenna 604 to provide the Internet Protocol (IP) connectivity to the GEO hub Earth station(s) 606 via a satellite link (shown as up-caret (^) in FIG. 6).

Further, the GEO SAT modem 506 may handle spot beam handovers, and the like. The GEO SAT antenna 604 may track the GEO satellite and communicate with the GEO SAT modem 506 to provide the IP connectivity to the GEO hub Earth station(s) 606. The GEO hub earth station(s) 606 may provide connectivity via the GEO SAT modem 506 and the GEO SAT antenna 604 to the IFC user I/F 602. Additionally, as the airline shifts from one GEO spot beam to another GEO spot beam (or even from one satellite to another), multiple GEO hub earth station(s) 606 may be used to provide connectivity to the user device 214 associated with passengers of the airline. The IFC traffic shaper 608 may provide a classification and a traffic shaping of downstream traffic. Furthermore, the public Internet 212 may be accessed by the user device 214 associated with passengers of the airline.

The IAT 204 may be for example, a LEO aero WAN transport system. The IAT 204 associated with the system 600 may include the LEO SAT modem 510, a LEO SAT antenna 610, which may collectively be referred to as IAT 204-1. Further, the IAT 204-1 may be implemented as an Internet Access Gateway System (IAGS) 204-2 when connected to a LEO gateway Earth station(s) 612 on the ground. For example, the IAT 204-1 associated with an aircraft is connected to LEO gateway Earth station(s) 612 on the ground to function as the Internet Access Gateway System (IAGS) 204-2. The IP connectivity to LEO gateway Earth station(s) 612 may be provided by a collaborative functioning of the LEO SAT modem 510 and LEO SAT antenna 616, managing tasks such as spot beam handovers. The LEO SAT antenna 616 may actively track a LEO satellite, collaborates with the LEO SAT modem 510 to establish IP connectivity to the LEO gateway Earth station(s) 612, ensuring smooth spot beam handovers. The LEO gateway Earth station(s) 612 may assumes a central role in providing connectivity, working alongside GEO SAT modem 506 and the GEO SAT antenna 604 to interface with the IFC user I/F 602. A plurality of gateways may be utilized to seamlessly transition as the airline moves across regions, maintaining uninterrupted connectivity.

Further, the system 600 may include the SD-WAN router 206 and the SD-WAN gateway 208, and the SD-WAN tunnels (not shown) for implementing the combining techniques of the system 600. The SD-WAN tunnels, one for each WAN transport path, may establish connections between the SD-WAN router 206 and SD-WAN gateway 208. The SD-WAN router 206 may manage upstream remote-site traffic, classifies, prioritizes, and selects WAN transports. Further, the SD-WAN router 206 may re-sequence tunneled downstream traffic for optimal flow. Similarly, the SD-WAN gateway 208 may be responsible for downstream traffic, routing the downstream traffic to the appropriate SD-WAN router 206, classifying, prioritizing, and selecting WAN transports. Further, the SD-WAN gateway 208 may re-sequence the tunneled upstream traffic for streamlined transmission. The placement of SD-WAN router 206 and SD-WAN gateway 208 in the system 600 may optimize the utilization of LEO satellite network components in the IAT 204, to minimize latency of the sensitive packets. The SD-WAN tunnel may carry traffic to/from the user devices 214 for overall efficiency and functionality of the system 600.

FIG. 7 illustrates a block diagram representation of a system 700, in which a software-defined wide area network (SD-WAN) is integrated into GEO satellite network, according to an example. In the system 700, the SD-WAN components are associated with the IFC system 202 such as the GEO satellite network. In the system 700, the SD-WAN router 206 may be communicatively coupled to the IFC user I/F 602. Further, the GEO SAT modem 506 and the LEO SAT modem 510 may be communicatively coupled to the SD-WAN router 206. Similarly, the SD-WAN gateway 208 may be communicatively coupled to the GEO hub Earth station(s) 606, the LEO gateway Earth station(s) 612, and the IFC traffic shaper unit 608.

The IFC user I/F 602 and the IFC traffic shaper unit 608 may function similar to the functionalities performed in the system 600, for managing end-user traffic, encompassing authentication/authorization (login), classification, and traffic shaping. The system 700 may mitigates an impact on both airline and a IFC service provider. The SD-WAN router 206 and SD-WAN gateway 208 may include additional roles in traffic classification and path selection, establishing a tunnel for each WAN/class of service differentiated services code point (DSCP) marking the tunneled traffic with the appropriate class of service for respective WAN transport. Further, a set of SD-WAN tunnels may be provided for each user device 214, where user devices 214 are identified by downstream IP (assuming there is no network address translation (NAT) performed in the IFC user I/F 602). A plurality of tunnels (simulating multiple users) and load-balancing traffic across the sets of tunnels. The SD-WAN 206 may identify the nearest SD-WAN gateway (where SD-WAN gateways are regionally placed relatively with minimal latency from matching LEO gateway) and shift to nearest SD-WAN gateway as the airline progresses with a brief traffic outage.

It should be well understood, the features described here-in apply to any mobile Internet Connectivity solution which involves augmenting an existing multi-user, authenticated/authorized GEO Internet guest type service running in a mobile vehicle (bus, train, ship, and the like) with a low-latency second WAN transport which may or may not be a LEO WAN transport. The SD-WAN LEO man-in-the-middle approach to augmenting an Internet Access Service with its man-in-the-middle handling of the IP address assignment, login authentication and authorization applies to the augmentation of even a non-mobile, guest Wi-Fi type services including those with non-GEO (and GEO) WAN transports. This would include the provision of Internet service to fixed remote locations including hospitality, restaurants, and the like.

FIG. 8 illustrates a block diagram representation of a system 800, in which the SD-WAN is integrated into an in-flight connectivity (IFC) interface associated with the GEO satellite network, according to an example. In the system 800, the SD-WAN components may be associated with the entire IFC system 202 such as the GEO IFC system as a WAN transport. In the system 800, the SD-WAN router 206 may be communicatively coupled to the IFC user I/F 602. Further, the LEO SAT modem 510 may be communicatively coupled to the SD-WAN router 206. Similarly, the SD-WAN gateway 208 may be communicatively coupled to the LEO gateway Earth station(s) 612, and the IFC traffic shaper unit 608. In one example, the IFC user I/F 602 and the GEO SAT modem 506 may be integrated into a single device as shown in FIG. 8.

The SD-WAN router 206 may authenticate and communicate to the IFC user I/F 602 as either a single or multiple passenger device. Both, the SD-WAN router 206 and SD-WAN gateway 208 may perform authentication/authorization (e.g., login), classification, and traffic shaping, each contributing to its distinct functionalities. The SD-WAN router 206 may communicate to the IFC user I/F 602, as a set of end-users. The SD-WAN router 206 may provide a separate tunnel (or set of tunnels, one per GEO IFC class of service) for each end-user. The SD-WAN router 206 may identify the nearest SD-WAN gateway (where SD-WAN gateways are regionally placed relatively with minimal latency from matching LEO gateway) and shift to other SD-WAN gateway as the airline progresses with a brief traffic outage.

Exemplary Scenarios

Consider, a scenario in which a business traveler boarding a flight for a crucial cross-country meeting. As the business traveler may expect that in-flight IP connectivity experience may be nothing short of a living room Wi-Fi. The airline may implement system 200 for an In-Flight Connectivity (IFC) solution designed to provide passengers with a seamless and reliable Internet experience from takeoff to landing.

As the aircraft ascends, the business traveler may connect effortlessly to the in-flight Wi-Fi, and immediately may notice the speed and stability reminiscent of home network. In the airline the passengers may always have Wi-Fi service, regardless of the flight phase.

In another scenario, a user may start to watch favorite TV series, streaming seamlessly without buffering interruptions. The system 200 may support passengers accessing their streaming video subscriptions, allowing to enjoy the latest episodes or movies during the flight journey. Further, a user being a sports enthusiast, may be aware that in-flight Wi-Fi enables real-time streaming of sports events. The user may watch favorite team play as if the user were in the comfort of own living room. The clarity and immediacy of the streaming service create an immersive experience, without disruption.

In another scenarios, for business passengers, the in-flight Wi-Fi may provide a reliability of the connection allowing to access VPNs and cloud-based applications effortlessly. With this capability, the business passengers may continue working on presentations, collaborate on documents, and stay productive during the flight, similar to office on the ground.

As the flight passes over airline hub regions, the seamless connectivity remains uninterrupted. Whether the user is sending emails, participating in video conferences, or browsing the Internet, the in-flight Internet experience mirrors the reliability and speed as on the ground.

Frequently, an airline may provide an In-Flight Entertainment (IFE) via the WAPs and via the GEO IFC user I/F. The SD-WAN router may be provided with a white-list of domain names or IP addresses allowing the SD-WAN router to forward IFE traffic to the IFC user I/F without tunneling that traffic, when the entertainment servers are reached by passing through the IFC user I/F.

In another example, an existing geosynchronous satellite-based IFC terminal (such as a Geostationary Earth Orbit (GEO) IFC) may support a second more-responsive Internet access path (sec path) (such as low earth orbit (LEO) satellite). This is implemented in a manner that changes to an existing GEO IFC are minimized and that response-time sensitive traffic is carried by the sec path, while bulk traffic (streaming video, and the like) is carried by a geosynchronous Internet access path (geo path) associated with the GEO IFC. An implementation includes a use of an enhanced software-defined wide area network (SD-WAN) router with two WAN connections, one being the GEO IFC and the other being the sec path. The SD-WAN router is connected between the wireless access points (WAPs) and the GEO IFC, and an equipment associated with the sec path. Further, the SD-WAN router classifies traffic, and, for each packet, the SD-WAN router selects the path to transmit packets by the geo path or the sec path.

FIG. 9A and FIG. 9B illustrate schematic diagram representations of a LEO antenna 900 and a thickness dimension of the LEO antenna 900, respectively, according to an example. The LEO antenna 900 includes a single Line Replaceable Unit (LRU) with integral components such as but not limited to, a Ku-band (specific frequency range in the microwave spectrum) full-duplex system, a Ku-Band Receive Frequency Unit (KRFU), a Ku-band antenna and network diversity unit (KANDU), and a Power Amplifier Housing (PAH) within the structure of the LEO antenna 900. The LEO antenna 900 incorporates a stationary configuration with no moving parts. For example, the LEO antenna 900 may include a weight for example, 60 lbs. 902, and measuring 67" in length 904, 18.5" in width 906, and 3" in height 910 (shown in FIG. 9B). The LEO antenna 900 may be a high gain antenna (HGA), aligning with the same specifications deployed in, for example, in the aviation industry. The HGA may include a length 908 of 104, and weight 910 of 200 lbs.

FIG. 10A and FIG. 10B illustrate schematic diagram representations of a narrow electrically steered antenna (ESA), and dimensions of the narrow ESA, respectively, according to an example. The narrow ESA 1000 may include a length of ESA 1000 is 67" in length 1004 and width 1002 is 18.5", which may allow packing in some of the airlines.

FIG. 11 illustrates a block diagram representation of a hardware platform 1100 for implementation of a computer system, according to an example. The computer system may be part of or any one of the systems 200, the SD-WAN router 206, the SD-WAN gateway 208, and the network transport modems to perform the functions and features described herein. For the sake of brevity, construction, and operational features of the system 200 which are explained in detail above are not explained in detail herein. Particularly, computing machines such as but not limited to internal/external server clusters, quantum computers, desktops, laptops, smartphones, tablets, and wearables which may be used to execute the system 200 or may have the structure of the hardware platform 1100. As illustrated, the hardware platform 1100 may include additional components not shown, and that some of the components described may be removed and/or modified. For example, a computer system with multiple Graphics Processing Unit (GPUs) may be located on external-cloud platforms including web services, or internal corporate cloud computing clusters, or organizational computing resources, and the like.

The hardware platform 1100 may be a computer system such as the system 100 that may be used with the embodiments described herein. The computer system may represent a computational platform that includes components that may be in a server or another computer system. The computer system may execute, by the processor 1105 (e.g., a single or multiple processors) or other hardware processing circuit, the methods, functions, and other processes described herein. These methods, functions, and other processes may be embodied as machine-readable instructions stored on a computer-readable medium, which may be non-transitory, such as hardware storage devices (e.g., RAM (random access memory), ROM (read-only memory), EPROM (erasable, programmable ROM), EEPROM (electrically erasable, programmable ROM), hard drives, and flash memory). The computer system may include the processor 1105 that executes software instructions or code stored on a non-transitory computer-readable storage medium 1110 to perform methods of the present disclosure.

The instructions on the computer-readable storage medium 1110 are read and stored the instructions in storage 1115 or in random access memory (RAM). The storage 1115 may provide a space for keeping static data where at least some instructions could be stored for later execution. The stored instructions may be further compiled to generate other representations of the instructions and dynamically stored in the RAM such as RAM 1120. The processor 1105 may read instructions from the RAM 1120 and perform actions as instructed.

The computer system may further include the output device 1125 to provide at least some of the results of the execution as output including, but not limited to, visual information to users, such as external agents. The output device 1125 may include a display on computing devices and virtual reality glasses. For example, the display may be a mobile phone screen or a laptop screen. Graphical user interfaces (GUIs) and/or text may be presented as an output on the display screen. The computer system may further include an input device 1130 to provide a user or another device with mechanisms for entering data and/or otherwise interact with the computer system. The input device 1130 may include, for example, a keyboard, a keypad, a mouse, or a touchscreen. Each of these output devices 1125 and input device 1130 may be joined by one or more additional peripherals. For example, the output device 1125 may be used to display the results.

A network communicator 1135 may be provided to connect the computer system to a network and in turn to other devices connected to the network including other clients, servers, data stores, and interfaces, for instance. A network communicator 1135 may include, for example, a network adapter such as a LAN adapter or a wireless adapter. The computer system may include a data sources interface 1140 to access the data source 1145. The data source 1145 may be an information resource. As an example, a database of exceptions and rules may be provided as the data source 1145. Moreover, knowledge repositories and curated data may be other examples of the data source 1145.

FIG. 12 illustrates a flow diagram representation of a method 1200 for integrating multi-path communication networks to provide In-Flight Connectivity (IFC) for users via the user devices 214, by augmenting data streams from multi-path satellite networks. The disclosed method may be performed by one or more components of the system (200, 206, 208, 500A, 500B, 600, 700, 800) disclosed herein. For example, with reference to FIG. 3, the steps disclosed herein may be performed by a processor. In yet another example, some of the steps disclosed herein may be performed by the SD-WAN router 206.

At step 1202, the method 1200 may include receiving, by a processor 302, a request for accessing a Wide Area Network (WAN) from a plurality of user devices 214. The plurality of user devices 214 is connected to the WAN via a plurality of SD-WAN tunnels, and the request comprises a plurality of data packets.

At step 1204, the method 1200 may include determining, by the processor 302, a plurality of parameters associated with the plurality of data packets based on the received request. The plurality of parameters includes, but not limited to, one of latency parameters, a class of service, user authorization levels, service plans, and the like.

At step 1206, the method 1200 may include classifying, by the processor 302, the plurality of data packets into a plurality of traffic types based on the determined plurality of parameters. The plurality of traffic types includes, but not limited to, one of a latency sensitive type, a bulk type, and the like.

At step 1208, the method 1200 may include prioritizing, by the processor 302, the plurality of data packets based on the plurality of traffic types and an available network capacity for an upstream transmission of the plurality of data packets across a IFC system 202 and a IAT 204.

At step 1210, the method 1200 may include determining, by the processor 302, an appropriate Wide Area Network (WAN) transport path associated with a SD-WAN tunnel for the upstream transmission based on the plurality of traffic types and a plurality of performance parameters. The appropriate WAN transport path may be determined from one of the IFC system 202 and the IAT 204. The plurality of performance parameters includes, but not limited to, one of a class of service, a load balancing, network congestion, a data marking, and the like.

At step 1212, the method 1200 may include transmitting, by the processor 302, the plurality of data packets to the WAN over the determined WAN transport path.

The order in which the method 1200 is described is not intended to be construed as a limitation, and any number of the described method blocks may be combined or otherwise performed in any order to implement the method 1200 or an alternate method. Additionally, individual blocks may be deleted from the method 1200 without departing from the spirit and scope of the ongoing description. Furthermore, the method 1200 may be implemented in any suitable hardware, software, firmware, or a combination thereof, that exists in the related art or that is later developed. The method 1200 describes, without limitation, the implementation of the system 200. A person of skill in the art will understand that method 200 may be modified appropriately for implementation in various manners without departing from the scope and spirit of the ongoing description.

Various examples of the present disclosure provide systems and methods for integrating multi-path communication networks to provide in-flight IP connectivity for users, by augmenting data streams from multi-path satellite networks. The systems and methods augment existing Geosynchronous (GEO) In-Flight Connectivity (IFC) with a Low Earth Orbit (LEO) WAN transport. This integration allows the LEO transport to handle more responsive services, particularly for time-sensitive traffic, while the GEO transport remains dedicated to carrying bulk traffic. The present disclosure provides systems and methods for assigning unique Internet protocol (IP) addresses, by creating distinct SD-WAN tunnels for each user devices. Further, the systems and method may simulate multiple user devices, by establishing multiple sets of SD-WAN tunnels, allowing for effective load balancing of data traffic.

Further, the system and methods may provide an SD-WAN LEO man-in-the-middle components to overlay an existing GEO IFC system with an SD-WAN overlay. The SD-WAN router may establish a set of SD-WAN tunnels through the GEO IFC system for each user devices, carrying the portion of the user's traffic best suited for the GEO IFC system. Further, to adapt to the pre-existing GEO IFC system use of either GEO or a low-latency transport, the system incorporates SD-WAN GEO auto detection. This includes measuring key performance parameters of the GEO IFC system, such as, for example, packet loss, outage detection, and available capacity. Based on these metrics, the SD-WAN may trigger to shift selected appropriate traffic away from the GEO IFC transport to the LEO transport, ensuring optimal performance. Additionally, the systems and methods may minimize latency to deliver an at-home Wi-Fi experience, by reducing web page download times by 5× to 10×. Further, the systems and methods may enable a virtual private network (VPN) and a cloud-based applications to be usable in IFC systems.

One of ordinary skill in the art will appreciate that techniques consistent with the ongoing description are applicable in other contexts as well without departing from the scope of the ongoing description.

As mentioned above, what is shown and described with respect to the systems and methods above are illustrative. While examples described herein are directed to configurations as shown, it should be appreciated that any of the components described or mentioned herein may be altered, changed, replaced, or modified, in size, shape, and numbers, or material, depending on application or use case, and adjusted for managing handoff.

It should also be appreciated that the systems and methods, as described herein, may also include, or communicate with other components not shown. For example, these may include external processors, counters, analyzers, computing devices, and other measuring devices or systems. This may also include middleware (not shown) as well. The middleware may include software hosted by one or more servers or devices. Furthermore, it should be appreciated that some of the middleware or servers may or may not be needed to achieve functionality. Other types of servers, middleware, systems, platforms, and applications not shown may also be provided at the back end to facilitate the features and functionalities of the testing and measurement system.

Moreover, single components may be provided as multiple components, and vice versa, to perform the functions and features described herein. It should be appreciated that the components of the system described herein may operate in partial or full capacity, or it may be removed entirely. It should also be appreciated that analytics and processing techniques described herein with respect to the optical measurements, for example, may also be performed partially or in full by other various components of the overall system.

It should be appreciated that data stores may also be provided to the apparatuses, systems, and methods described herein, and may include volatile and/or non-volatile data storage that may store data and software or firmware including machine-readable instructions. The software or firmware may include subroutines or applications that perform the functions of the measurement system and/or run one or more application that utilize data from the measurement or other communicatively coupled system.

The various components, circuits, elements, components, and interfaces may be any number of mechanical, electrical, hardware, network, or software components, circuits, elements, and interfaces that serves to facilitate communication, exchange, and analysis data between any number of or combination of equipment, protocol layers, or applications. For example, the components described herein may each include a network or communication interface to communicate with other servers, devices, components or network elements via a network or other communication protocol.

Although examples are directed to satellite communication systems, such as GEO and LEO satellite network systems, it should be appreciated that the systems and methods described herein may also be used in other various systems and other implementations. For example, these may include other various telecommunication test and measurement systems. In fact, there may be numerous applications in cable or optical communication networks, not to mention fiber sensor systems that could employ the systems and methods as well.

What has been described and illustrated herein are examples of the implementation along with some variations. The terms, descriptions, and figures used herein are set forth by way of illustration only and are not meant as limitations. Many variations are possible within the scope of the implementations, which is intended to be defined by the following claims—and their equivalents—in which all terms are meant in their broadest reasonable sense unless otherwise indicated.

The invention claimed is:

1. A system comprising:
   an In-Flight Connectivity (IFC) system configured to provide wireless network connectivity to a plurality of user devices;
   an Internet Access Terminal (IAT) configured to provide augmented wireless network connectivity to the plurality of user devices; and
   a Software-Defined Wide Area Network (SD-WAN) router communicatively coupled to the IFC system and the IAT, wherein the SD-WAN router includes:
   a processor; and
   a memory coupled to the processor, wherein the memory includes processor-executable instructions, which on execution, cause the processor to:
      receive a request for accessing a Wide Area Network (WAN) from the plurality of user devices, wherein the plurality of user devices is connected to the WAN via a plurality of SD-WAN tunnels, and wherein the request includes a plurality of data packets;
      determine a plurality of parameters associated with the plurality of data packets based on the received request, wherein the plurality of parameters comprise one of latency parameters, a class of service, user authorization levels, and service plans;
      classify the plurality of data packets into a plurality of traffic types based on the determined plurality of parameters, wherein the plurality of traffic types includes one of a latency sensitive type, and a bulk type;
      prioritize the plurality of data packets based on the plurality of traffic types and an available network capacity for an upstream transmission of the plurality of data packets across the IFC system and the IAT;
      determine an appropriate Wide Area Network (WAN) transport path associated with a SD-WAN tunnel for the upstream transmission based on the plurality of traffic types and a plurality of performance parameters, wherein the appropriate WAN transport path is determined from one of the IFC system and the IAT and wherein the plurality of performance parameters comprise one of a class of service, a load balancing, network congestion, and a data marking; and
      transmit the plurality of data packets to the WAN over the determined WAN transport path.

2. The system of claim 1, wherein the SD-WAN router is to:
   re-sequence a tunneled downstream traffic corresponding to an Internet protocol (IP) flow carried by the appropriate Wide Area Network (WAN) transport path, wherein the tunneled downstream traffic includes a plurality of prioritized data packets; and
forward the re-sequenced tunneled downstream traffic in a downstream transmission to the plurality of user devices.

3. The system of claim 1, further includes:
   a Software Defined Wide Area Network (SD-WAN) gateway to:
      receive a plurality of data packets from the WAN for a downstream transmission to the plurality of user devices over the plurality of SD-WAN tunnels;
      determine the plurality of parameters associated with the received plurality of data packets;
      classify the plurality of data packets into the plurality of traffic types based on the determined plurality of parameters;
      prioritize the plurality of data packets based on the plurality of traffic types and the available network capacity for a downstream transmission of the plurality of data packets across the IFC system and the IAT;
      determine the appropriate Wide Area Network (WAN) transport path associated with the SD-WAN tunnel for the downstream transmission of the plurality of data packets based on the plurality of traffic types and the plurality of performance parameters, wherein the appropriate WAN transport path is determined from one of the IFC system and the IAT; and
      transmit the plurality of data packets to the plurality of user devices over the determined WAN transport path.

4. The system of claim 3, wherein the SD-WAN gateway is to:
   re-sequence a tunneled upstream traffic corresponding to an Internet Protocol (IP) flow carried by the appropriate Wide Area Network (WAN) transport path, wherein the tunneled upstream traffic includes a plurality of prioritized data packets; and
   forward the re-sequenced tunneled upstream traffic in an upstream transmission to the WAN.

5. The system of claim 1, further comprising:
   an IFC user interface communicatively coupled to the plurality of user devices via a Wireless Access Point (WAP) and the SD-WAN router;
   the IFC system communicatively coupled to the IFC user interface via the SD-WAN router, wherein the IFC system includes:
      an In-Flight Connectivity (IFC) modem communicatively coupled to the SD-WAN router and an In-Flight Connectivity (IFC) antenna unit; and
      an In-Flight Connectivity (IFC) hub earth station communicatively coupled to the IFC antenna unit;
   the IAT communicatively coupled to the IFC user interface via the SD-WAN router, wherein the IAT includes:
      an internet access modem communicatively coupled to the SD-WAN router and an internet access antenna unit;
      wherein the IA antenna unit is communicatively coupled to an internet access gateway earth station;
   an IFC traffic shaper unit communicatively coupled to the IFC system and the IAT via a SD-WAN gateway, and wherein the IFC traffic shaper unit is connected to the WAN;
   wherein each of the SD-WAN router and the SD-WAN gateway includes a set of SD-WAN tunnels assigned to each of the plurality user devices, and wherein the plurality of user devices is identified by a downstream Internet Protocol (IP) assigned with an IP address; and wherein each of the SD-WAN router and the SD-WAN gateway performs traffic shaping using the set of SD-WAN tunnels and by determining a load-balancing traffic across each of the set of SD-WAN tunnels.

6. The system of claim 1, wherein the SD-WAN router is communicatively connected between the plurality of user devices and a IFC user interface, and wherein the SD-WAN router is connected to the IFC system via the IFC user interface and further connected to the IAT, wherein the SD-WAN router is to:

authenticate the plurality of the user devices using a set of credentials associated with each service plan, wherein the SD-WAN router is to allocate a separate tunnel for each set of credentials and assign a separate downstream IP address for each login;

wherein the SD-WAN router and SD-WAN gateway performs an authentication, an authorization, a classification, and a traffic shaping functionality agnostic to a corresponding functionality associated with the IFC system; and wherein SD-WAN router is to determine a whitelist of domain names and IP addresses associated with an In-Flight Entertainment (IFE) traffic and forward the IFE traffic to the IFC user interface.

7. The system of claim 6, wherein the SD-WAN router operates outside the IFC system by using the IFC system as a WAN transport and the SD-WAN router is to:

monitor a login process associated with each of the plurality of user devices; and tunnel the plurality of data packets upon a successful login process, wherein the SD-WAN router operates at a Medium Access Control (MAC) level by:

forwarding an assignment of IP addresses to the plurality of user devices using a Dynamic Host Configuration Protocol (DHCP); and terminating the SD-WAN tunnel using a MAC address and the IP addresses of the plurality of user devices;

wherein the SD-WAN router operates as the DHCP proxy by assigning a plurality of IP addresses to each of the plurality of user devices;

wherein the SD-WAN router operates as the routing hop by using a router MAC address and with an IP address for each of the plurality of user devices; and wherein the SD-WAN tunneled traffic is modified by using a plurality of headers in the SD-WAN tunnel, wherein the modified SD-WAN traffic corresponds to a Virtual Private Network (VPN) traffic.

8. The system of claim 7, wherein the SD-WAN gateway is communicatively connected between the WAN and the IFC traffic shaper unit, and wherein the SD-WAN gateway is connected to the IFC system via the IFC traffic shaper unit, and further connected to the IAT.

9. The system of claim 1, wherein the SD-WAN router is to:

periodically generate an appropriate amount of data packets to measure a latency of the IFC system and the IAT;

determine that the IFC system is in use by:

determining that the measured latency of the IFC system is above a threshold value;

monitoring the appropriate amount of data packets passing through the SD-WAN router; and measuring a round-trip time with respect to a threshold round trip time;

wherein the SD-WAN router is to detect a transition of the IFC system from a high-latency satellite link to a low-latency terrestrial link by:

transmitting the plurality of data packets via the set of SD-WAN tunnels and routing an upstream traffic and a downstream traffic via the IFC system;

transmitting the plurality of data packets via the set of SD-WAN tunnels and routing the upstream traffic and the downstream traffic via the IFC system until the IFC system is determined to be congested;

performing load balancing of additional traffic across the IAT upon determining that the IFC system is congested; and wherein the SD-WAN router is to:

bypass the set of SD-WAN tunnels and transmit the upstream traffic and the downstream traffic in an unmodified format via the IFC system in an IFC insert network and a man-in-middle network; and bypass the SD-WAN tunnels and transmit the upstream traffic and the downstream traffic in an unmodified format excluding a network address translation operation via the IFC system in an overlay network; and wherein the SD-WAN router is to:

detect a performance degradation level of the IFC system based on the plurality of performance parameters and the available network capacity; and shift at least one of the upstream traffic and the downstream traffic away from the IFC system to the IAT based on the detected performance degradation level.

10. The system of claim 1, wherein the IFC system is associated with a GEO IFC system and the IAT is associated with a LEO internet access system.

11. A method comprising:

receiving, by a processor, a request for accessing a Wide Area Network (WAN) from a plurality of user devices, wherein the plurality of user devices is connected to the WAN via a plurality of SD-WAN tunnels, and wherein the request includes a plurality of data packets;

determining, by the processor, a plurality of parameters associated with the plurality of data packets based on the received request, wherein the plurality of parameters comprise one of latency parameters, a class of service, user authorization levels, and service plans;

classifying, by the processor, the plurality of data packets into a plurality of traffic types based on the determined plurality of parameters, wherein the plurality of traffic types comprises one of a latency sensitive type, and a bulk type;

prioritizing, by the processor, the plurality of data packets based on the plurality of traffic types and an available network capacity for an upstream transmission of the plurality of data packets across an In-Flight Connectivity (IFC) system and an Internet Access Terminal (IAT);

determining, by the processor, an appropriate Wide Area Network (WAN) transport path associated with a SD-WAN tunnel for the upstream transmission based on the plurality of traffic types and a plurality of performance parameters, wherein the appropriate WAN transport path is determined from one of the IFC system and the IAT and wherein the plurality of performance parameters comprise one of a class of service, a load balanc-
ing, network congestion, and a data marking; and transmitting, by the processor, the plurality of data pack-
ets to the WAN over the determined WAN transport
path.

12. The method of claim 11, further comprising:

re-sequencing, by the processor, a tunneled downstream
traffic corresponding to an Internet Protocol (IP) flow
carried by the appropriate Wide Area Network (WAN)
transport path, wherein the tunneled downstream traffic
includes a plurality of prioritized data packets; and forwarding, by the processor, the re-sequenced tunneled
downstream traffic in a downstream transmission to the
plurality of user devices.

13. The method of claim 11, further comprising:

receiving, by an SD-WAN gateway, a plurality of data
packets from the WAN for a downstream transmission
to the plurality of user devices over the plurality of
SD-WAN tunnels;

determining, by the SD-WAN gateway, the plurality of
parameters associated with the received plurality of
data packets;

classifying, by the SD-WAN gateway, the plurality of data
packets into the plurality of traffic types based on the
determined plurality of parameters;

prioritizing, by the SD-WAN gateway, the plurality of
data packets based on the plurality of traffic types and
the available network capacity for a downstream trans-
mission of the plurality of data packets across the IFC
system and the IAT;

determining, by the SD-WAN gateway, the appropriate
Wide Area Network (WAN) transport path associated
with the SD-WAN tunnel for the downstream transmis-
sion of the plurality of data packets based on the
plurality of traffic types and the plurality of perfor-
mance parameters, wherein the appropriate WAN trans-
port path is determined from one of the IFC system and
the IAT; and transmitting, by the SD-WAN gateway, the plurality of
data packets to the plurality of user devices over the
determined WAN transport path.

14. The method of claim 13, further comprising:

re-sequencing, by the SD-WAN gateway, a tunneled
upstream traffic corresponding to an Internet Protocol
(IP) flow carried by the appropriate Wide Area Network
(WAN) transport path, wherein the tunneled upstream
traffic includes a plurality of prioritized data packets;
and forwarding, by the SD-WAN gateway, the re-sequenced
tunneled upstream traffic in an upstream transmission
to the WAN.

15. The method of claim 11, wherein the SD-WAN router
is communicatively connected between the plurality of user
devices and the IFC user interface, and wherein the SD-
WAN router is connected to the IFC system via the IFC user
interface and further connected to the IAT, the method
includes:

authenticating, by the processor, the plurality of the user
devices using a set of credentials associated with each
service plan, wherein the SD-WAN router is to allocate
a separate tunnel for each set of credentials and assign
a separate downstream IP address for each login;

performing, by the processor, an authentication, an autho-
rization, a classification, and a traffic shaping function-
ality agnostic to a corresponding functionality associ-
ated with the IFC system; and determining, by the processor, a whitelist of domain
names and IP addresses associated with an In-Flight
Entertainment (IFE) traffic and forwarding the IFE
traffic to the IFC user interface.

16. The method of claim 15, wherein the SD-WAN router
operates outside the IFC system by using the IFC system as
a WAN transport, the method includes:

monitoring, by the processor, a login process associated
with each of the plurality of user devices; and tunnelling, by the processor, the plurality of data packets
upon a successful login process, wherein the SD-WAN
router operates at a Medium Access Control (MAC)
level by:

forwarding, by the processor, an assignment of IP
addresses to the plurality of user devices using a
DHCP; and terminating, by the processor, the SD-WAN tunnel
using a MAC address and the IP addresses of the
plurality of user devices;

operating, by the processor, as the DHCP proxy by
assigning a plurality of IP addresses to each of the
plurality of user devices;

operating, by the processor, as the routing hop by using
a router MAC address and with an IP address for
each of the plurality of user devices; and modifying, by the processor, the SD-WAN tunneled
traffic using a plurality of headers in the SD-WAN
tunnel, wherein the modified SD-WAN traffic corre-
sponds to a Virtual Private Network (VPN) traffic.

17. The method of claim 11, further comprising:

periodically generating, by the processor, an appropriate
amount of data packets to measure a latency of the IFC
system and the IAT;

determining, by the processor, that the IFC system is in
use by:

determining, by the processor, that the measured
latency of the IFC system is above a threshold value;

monitoring, by the processor, the appropriate amount of
data packets passing through the SD-WAN router;
and measuring, by the processor, a round-trip time with
respect to a threshold round trip time; and detecting, by the processor, a transition of the IFC system
from a high-latency satellite link to a low-latency
terrestrial link by:

transmitting, by the processor, the plurality of data
packets via the set of SD-WAN tunnels and routing
an upstream traffic and a downstream traffic via the
IFC system;

transmitting, by the processor, the plurality of data
packets via the set of SD-WAN tunnels and routing
the upstream traffic and the downstream traffic via
the IFC system until the IFC system is determined to
be congested;

performing, by the processor, load balancing of addi-
tional traffic across the IAT upon determining that the
IFC system is congested;

bypassing, by the processor, the set of SD-WAN tun-
nels and transmit the upstream traffic and the down-
stream traffic in an unmodified format via the IFC
system;

bypassing, by the processor, the SD-WAN tunnels and
transmit the upstream traffic and the downstream
traffic in an unmodified format excluding a network
address translation operation via the IFC system;

detecting, by the processor, a performance degradation level of the IFC system based on the plurality of performance parameters and the available network capacity; and shifting, by the processor, at least one of the upstream traffic and the downstream traffic away from the IFC system to the IAT based on the detected performance degradation level.

18. A non-transitory computer-readable medium comprising machine-readable instructions that are executable by a processor to:

receive a request for accessing a Wide Area Network (WAN) from the plurality of user devices, wherein the plurality of user devices is connected to the WAN via a plurality of SD-WAN tunnels, and wherein the request includes a plurality of data packets;

determine a plurality of parameters associated with the plurality of data packets based on the received request, wherein the plurality of parameters comprise one of latency parameters, a class of service, user authorization levels, and service plans;

classify the plurality of data packets into a plurality of traffic types based on the determined plurality of parameters, wherein the plurality of traffic types comprises one of a latency sensitive type, and a bulk type;

prioritize the plurality of data packets based on the plurality of traffic types and an available network capacity for an upstream transmission of the plurality of data packets across the IFC system and the IAT;

determine an appropriate Wide Area Network (WAN) transport path associated with a SD-WAN tunnel for the upstream transmission based on the plurality of traffic types and a plurality of performance parameters, wherein the appropriate WAN transport path is determined from one of the IFC system and the IAT and wherein the plurality of performance parameters comprise one of a class of service, a load balancing, network congestion, and a data marking; and transmit the plurality of data packets to the WAN over the determined WAN transport path.

19. The non-transitory computer-readable medium of claim 18, wherein the processor is to:

re-sequence a tunneled downstream traffic corresponding to an Internet Protocol (IP) flow carried by the appropriate Wide Area Network (WAN) transport path, wherein the tunneled downstream traffic includes a plurality of prioritized data packets; and forward the re-sequenced tunneled downstream traffic in a downstream transmission to the plurality of user devices.

20. The non-transitory computer-readable medium of claim 18, wherein the processor is to:

receive a plurality of data packets from the WAN for a downstream transmission to the plurality of user devices over the plurality of SD-WAN tunnels;

determine the plurality of parameters associated with the received plurality of data packets;

classify the plurality of data packets into the plurality of traffic types based on the determined plurality of parameters;

prioritize the plurality of data packets based on the plurality of traffic types and the available network capacity for a downstream transmission of the plurality of data packets across the IFC system and the IAT;

determine the appropriate Wide Area Network (WAN) transport path associated with the SD-WAN tunnel for the downstream transmission of the plurality of data packets based on the plurality of traffic types and the plurality of performance parameters, wherein the appropriate WAN transport path is determined from one of the IFC system and the IAT; and transmit the plurality of data packets to the plurality of user devices over the determined WAN transport path.

* * * * *